US010541989B2

(12) United States Patent
Ellingson et al.

(10) Patent No.: US 10,541,989 B2
(45) Date of Patent: *Jan. 21, 2020

(54) SYSTEMS AND METHODS FOR EPHEMERAL SHARED DATA SET MANAGEMENT AND COMMUNICATION PROTECTION

(71) Applicant: InfoSci, LLC, Haymarket, VA (US)

(72) Inventors: John Ellingson, Haymarket, VA (US); Matthew Richardson, Arlington, VA (US)

(73) Assignee: InfoSci, LLC, Haymarket, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/148,651

(22) Filed: Oct. 1, 2018

(65) Prior Publication Data
US 2019/0036899 A1 Jan. 31, 2019

Related U.S. Application Data

(63) Continuation of application No. 15/788,981, filed on Oct. 20, 2017, now Pat. No. 10,122,699.
(Continued)

(51) Int. Cl.
H04L 29/06 (2006.01)
G06F 16/176 (2019.01)
G06F 16/178 (2019.01)

(52) U.S. Cl.
CPC ............ *H04L 63/08* (2013.01); *G06F 16/176* (2019.01); *G06F 16/178* (2019.01); *H04L 63/0428* (2013.01)

(58) Field of Classification Search
CPC .............. H04L 63/08; H04L 63/0428; G06F 17/30165; G06F 17/30174; G06F 16/178; G06F 16/176
See application file for complete search history.

(56) References Cited

U.S. PATENT DOCUMENTS 4,405,829 A 9/1983 Rivest et al.
6,295,541 B1* 9/2001 Bodnar ............ G06F 17/30581
(Continued)

OTHER PUBLICATIONS

Thierry Moreau, "Why Should We Look for Alternatives to the Public Key Infrastructure (PKI) Model?" CONNOTECH Experts-conseils Inc., Aug. 1999, Québec, Canada, 4 pages.
(Continued)

Primary Examiner — J. Brant Murphy
(74) Attorney, Agent, or Firm — The Marbury Law Group, PLLC

(57) ABSTRACT

Various embodiments provide methods and computing devices configured to implement the methods for dynamically changing an ephemeral shared data set. Various embodiments provide methods and computing devices configured to implement the methods for the dynamic generation of a value that may be used to protect a communication based on the dynamically changed ephemeral shared data set. Various embodiments incorporate the assumption that trusted systems ultimately are demonstrably insecure, because such systems are penetrable and vulnerable. Various embodiments provide a digital communication system that assumes no trust among various network elements, for at least the reason that the digital environment is inherently untrustworthy.

21 Claims, 21 Drawing Sheets

Related U.S. Application Data

(60) Provisional application No. 62/513,047, filed on May 31, 2017.

(56) References Cited

U.S. PATENT DOCUMENTS

| | | | | |
|---|---|---|---|---|
| 8,964,947 | B1* | 2/2015 | Noolu | H04M 3/541 |
| | | | | 379/88.01 |
| 9,021,269 | B2 | 4/2015 | Spilman | |
| 9,813,245 | B2* | 11/2017 | Le Saint | H04L 9/0841 |
| 2006/0053285 | A1* | 3/2006 | Kimmel | H04L 63/0428 |
| | | | | 713/166 |
| 2007/0022302 | A1 | 1/2007 | Richards, Jr. et al. | |
| 2007/0186115 | A1 | 8/2007 | Gao et al. | |
| 2008/0301228 | A1* | 12/2008 | Flavin | G06Q 10/10 |
| | | | | 709/204 |
| 2009/0135725 | A1* | 5/2009 | Tanaka | H04L 43/50 |
| | | | | 370/241 |
| 2009/0161876 | A1* | 6/2009 | Sherkin | H04L 9/3066 |
| | | | | 380/278 |
| 2011/0202755 | A1* | 8/2011 | Orsini | H04L 63/029 |
| | | | | 713/151 |
| 2012/0167169 | A1* | 6/2012 | Ge | H04L 9/321 |
| | | | | 726/2 |
| 2013/0097117 | A1* | 4/2013 | Lasky | G06F 11/1451 |
| | | | | 707/624 |
| 2013/0152160 | A1* | 6/2013 | Smith | G06F 21/604 |
| | | | | 726/1 |
| 2013/0243194 | A1* | 9/2013 | Hawkes | H04L 63/067 |
| | | | | 380/270 |
| 2014/0164776 | A1* | 6/2014 | Hook | H04L 9/14 |
| | | | | 713/171 |
| 2015/0039651 | A1* | 2/2015 | Kinsely | G06F 17/30563 |
| | | | | 707/779 |
| 2015/0286719 | A1 | 12/2015 | Kemp | |
| 2015/0372811 | A1* | 12/2015 | Le Saint | H04L 9/0841 |
| | | | | 705/76 |
| 2016/0065370 | A1* | 3/2016 | Le Saint | H04L 9/0841 |
| | | | | 713/155 |
| 2017/0201380 | A1* | 7/2017 | Schaap | G06F 8/654 |
| 2017/0324548 | A1* | 11/2017 | Anshel | H04L 9/14 |

OTHER PUBLICATIONS

Salem et al. "The Case for Dynamic Key Distribution for PKI-based Vanets" International Journal of Computer Networks & Communications (IJCNC) vol. 6, No. 1, pp. 61-78, Jan. 2014.

International Search Report and Written Opinion of the International Searching Authority for International Application No. PCT/US2018/027316, dated Aug. 30, 2018, 13 pages.

* cited by examiner

SYSTEMS AND METHODS FOR EPHEMERAL SHARED DATA SET MANAGEMENT AND COMMUNICATION PROTECTION

RELATED APPLICATIONS

This application is a continuation application of U.S. Non-Provisional patent application Ser. No. 15/788,981 entitled "Systems and Methods for Ephemeral Shared Data Set Management and Communication Protection" filed on Oct. 20, 2017, which claims the benefit of priority to Provisional Application No. 62/513,047 entitled "Systems and Methods for Dynamic Shared Data Set Management and Communication Protection" filed May 31, 2017, the entire contents of both of which are hereby incorporated by reference for all purposes.

BACKGROUND

The development of the digital environment has enabled a vast expansion in rapid communication and information transactions, among other things. However, the security paradigm from the past used in this new environment has inherent vulnerabilities: the concept of shared secrets and the concomitant trust. The paradigm of the shared secret has been incorporated into the digital environment in numerous ways—from usernames and passwords, to secure communications between users and systems. For example, this concept is foundational to the Secure Socket Layer, Certificate Authority, Public Key Information security infrastructure.

However, the digital environment is one in which secrets are difficult to keep for more than a short period of time, and once secrecy is lost the formerly secret information may be proliferated rapidly and with complete fidelity. The digital environment is also one in which shared secrets and credentials have become a primary target of "hacking" that has transformed many "secrets" (e.g., passwords, digital certificates, private information and other types of authentication data) into a commodity freely traded on the gray and black markets, destroying the benefit of such secrets for securing digital exchanges. Yet, the underlying security mechanism of the digital environment remains dependent upon the safe operation of this false assumption that the secret is still secret.

Verification of the presented identity and authentication of a computing device is a critical aspect of numerous electronic communications. However, the vulnerability of shared secrets, as well as the vulnerability of communications in transmission, dramatically undermines the reliability and security of digital certificates or other similar information for trusted device identity verification.

SUMMARY

Various embodiments provide methods and computing devices configured to implement the methods for continuous refreshing and changing of a shared data set. Various embodiments provide methods and computing devices configured to implement the methods for the dynamic generation of a value that may be used to protect a communication based on the dynamically changed (e.g., ephemeral) shared data set. Various embodiments incorporate the assumption that trusted systems ultimately are demonstrably insecure, because such systems are penetrable and vulnerable. Various embodiments provide a digital communication system that assumes no trust among various network elements, for at least the reason that the digital environment is inherently untrustworthy.

Various embodiments include methods that may be implemented on a processor of a computing device (e.g., a data set management device). Various embodiments may include providing an ephemeral shared data set from a data set management device to the first computing device and the second computing device, generating an instruction to alter the ephemeral shared data set, and sending the generated instruction to the first computing device and the second computing device to alter the ephemeral shared data set at the first and second computing devices according to the generated instruction so that the ephemeral shared data set stored at the first computing device is the same as the ephemeral shared data set stored at the second computing device.

In some embodiments, generating an instruction to alter the shared data set may include determining whether a data set update trigger has occurred, and generating the instruction to alter the ephemeral shared data set in response to determining that the data set update trigger has occurred. In some embodiments, generating an instruction to alter the shared data set may include generating an instruction to replace the ephemeral shared data set with a replacement data set determined by the data set management device.

In some embodiments, generating an instruction to alter the ephemeral shared data set may include generating an instruction to add a new portion to the ephemeral shared data set based on data inputs received at the data set management device. In some embodiments, generating an instruction to alter the ephemeral shared data set may include generating an instruction to subtract a portion of the shared data set. In some embodiments, generating an instruction to alter the ephemeral shared data set may include generating an instruction to re-order the ephemeral shared data set. In some embodiments, generating an instruction to alter the ephemeral shared data set may include generating an instruction to transform the ephemeral shared data set. In some embodiments, the method may further include performing a synchronization operation with the first computing device and the second computing device so that the altered data set stored at the first computing device is the same as the altered data set stored at the second computing device.

Various embodiments include methods that may be implemented on a processor of a computing device of protecting a communication. Various embodiments may include selecting elements from an ephemeral shared data set stored at the computing device and a second computing device, generating a rule set indicating the selected elements, sending the generated rule set to the second computing device, generating a result based on the selected elements, receiving an encrypted communication from the second computing device, attempting to decrypt the encrypted communication using the generated result, and determining whether the attempted decryption was successful.

In some embodiments, selecting elements from the ephemeral shared data set stored at the computing device and the second computing device may include receiving instructions from a data set management device to extract elements from the ephemeral shared data set stored at the computing device and a second computing device, and extracting elements from the shared data set according to the instructions. In such embodiments, selecting elements from the shared data set stored at the computing device and the second computing device may include selecting elements from among the extracted elements. In some embodiments, the method may further include encrypting a communication using the first result in response to determining that the attempted decryption was successful, and sending the encrypted communication to the second computing device.

Further embodiments may include computing devices configured with processor-executable instructions to perform operations of the methods summarized above. Further embodiments may include processor-readable storage media on which are stored processor-executable instructions configured to cause a processor of a computing device to perform operations of the methods described above. Further embodiments may include computing devices including means for performing functions of the methods described above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
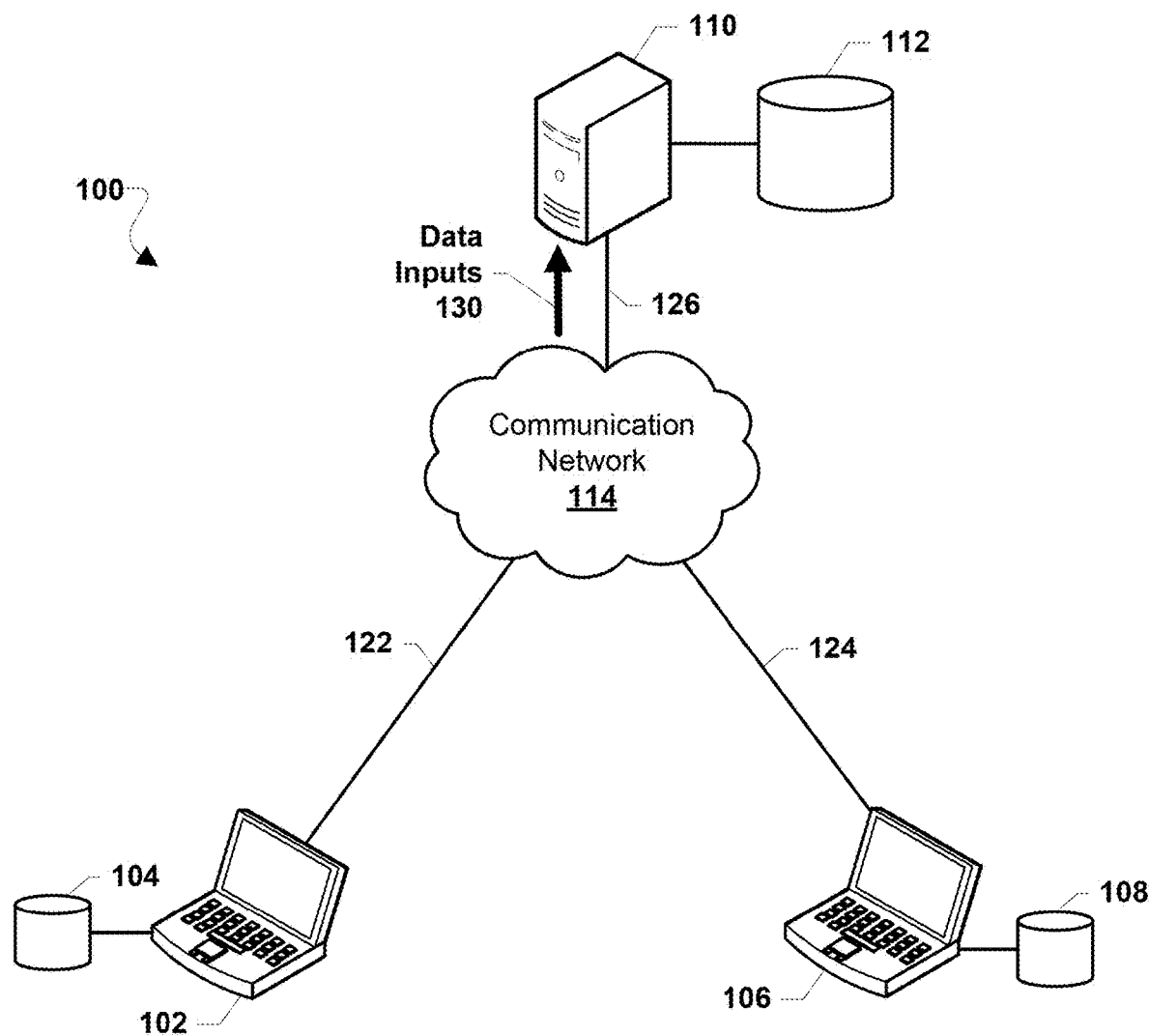
FIG. 1 is a component block diagram of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide methods, and computing devices (or other digital or programmable devices) configured to implement the methods, that enable the management of a shared data set. In various embodiments, the shared data set may be stored at two or more computing devices. In some embodiments, the shared data set may be dynamic, and may be altered from time to time. In various embodiments, the shared data set may be ephemeral, and may be altered after a relatively short period of time. In some embodiments, the dynamically-altered shared data set may provide a vast amount of complex random data using a relatively small starting data set. In various embodiments, the ephemeral shared data set may be used by two or more computing devices to generate a dynamic value. In some embodiments, the dynamically-generated value may be used to protect a communication between the two or more computing devices.

In various embodiments, the communication system may employ the dynamically-changing shared data and the dynamically generated value to protect the communication in a manner that does not rely on the paradigm of shared secrets and static information.

Because the ephemeral shared data set may be changed dynamically from time to time (e.g., upon the occurrence of a trigger event, periodically, aperiodically, etc.), and the dynamically generated value may be based on the dynamically changing ephemeral shared data set, various embodiments improve the security function of any communication network or any electronic communication system by improving the security of communications. Various embodiments also improve the security function of any communication network or system by using an ephemeral (dynamically changing) shared data set and a dynamically generated value, without relying on easily compromised static identification information, such as a shared secret (e.g., a shared certificate for a shared key, such as may be used in the public key infrastructure (PKI)) that may be vulnerable to attack by access and/or copying. Various embodiments also improve the security function of any communication network or system because the dynamic shared data set is not transmitted from one computing device to another. Various embodiments also improve the security function of any communication network or system because the dynamically generated value is not transmitted from one computing device to another.

The term "computing device" refers to any programmable computer or processor that can be configured with programmable instructions to perform various embodiment methods. A computing device may include one or all of personal computers, laptop computers, tablet computers, cellular telephones, smartphones, Internet enabled cellular telephones, Wi-Fi enabled electronic devices, personal data assistants (PDAs), wearable computing devices (including smart watches, necklaces, medallions, and any computing device configured to be worn, attached to a wearable item, or embedded in a wearable item), wireless accessory devices, memory sticks, dongles, wireless peripheral devices, Internet of Things (IoT) devices, autonomous vehicles, semiautonomous vehicles, and remotely directed vehicles, smart firearms, network elements such as servers, routers, gateways, and the like (including so-called "cloud" computing devices), and similar electronic devices equipped with a short-range radio (e.g., a Bluetooth, Peanut, ZigBee, and/or Wi-Fi radio, etc.) and/or a wide area network connection (e.g., using one or more cellular radio access technologies to communicate using a wireless wide area network transceiver, or a wired connection to a communication network).

The terms "component," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, an object, an executable, a thread of execution, a program, and/or a computer. By way of illustration, both an application running on a wireless device and the wireless device itself may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Among other things, the digital environment enables rapid communication and information transactions on up to a global scale. However, the current digital environment rests on a shaky security foundation: the old paradigm of the static shared secret. There are numerous fundamental differences between the purely human environment we operated in for thousands of years until the late 20th century and the digital environment we operate in today.

Further, the digital environment is one in which secrets are difficult to keep over time. Once secrecy is lost the formerly secret information may be proliferated rapidly and with complete fidelity and used by an attackers. Breakdowns in digital system security, resulting in massive data breaches, have become nearly commonplace and the frequency of their occurrence has accelerated.

Indeed, the emergence of the rapidly expanding, multi-billion dollar cybersecurity industry is indicative of the endemic failure of security in general throughout the digital environment. As but one example, cybercrimes such as identity fraud are among the fastest growing crimes, with threats continuing to accelerate in capability and scale. The proliferation of network-connected devices, including smart phones, wearable computers, gaming systems, Internet of Things devices, and the like is exacerbating the scale and extent of digital security risks. For example, many of these devices are either themselves untrustworthy or are interacting with untrustworthy mobile networks, and few such devices have the computing power to perform traditional security functions of familiar desktops and laptops.

In the majority of the breach incidents, a violation of trust or the misuse of a shared secret (e.g., a credential) is at the root of the failure. While in certain cases a particular security failure may be due to a lack of strength in the technology employed to provide the trust and security, in general security failures in the digital environment have occurred in a wide variety of industries using a variety of technology deployments. Security failures occur across the board and are attributable not only to any particular deployed technology, but also to the practices and procedures inherent to its application and use. Thus, security failures in the digital environment are due to something more fundamental and endemic in the root strategy of the trust paradigm of the shared secret that has failed.

The current obsolete paradigm of digital security fails for at least three fundamental reasons: (1) the current paradigm is based on trust, and trust is frequently violated or misplaced; (2) the current paradigm is based on maintaining stable or static shared secrets, but the secrets do not remain secret, and are as useful to an attacker as to an authorized user; and (3) the vast majority of information transactions are between anonymous parties (strangers). Thus, "trusted systems" ultimately do not work because they are penetrable and vulnerable. Moreover, current "trusted systems" are vulnerable to penetration and exploitation in large part due to the use of static or durable information that does not vary with time (or duration); and failures of policy and human factors (e.g., social engineering, negligence, etc.). The vulnerability of shared secrets dramatically undermines the reliability of digital certificates or other similar information to protect communications.

Various embodiments disclosed in this application address the security vulnerability of digital systems and improve electronic security for device-to-device communication. Various embodiments provide computer-implemented methods to provide for continuous refreshing and changing of an ephemeral shared data set. Various embodiments provide computer-implemented methods to provide for the dynamic generation of a value that may be used to protect a communication based on the dynamically changed ephemeral shared data set. Various embodiments incorporate the assumption that trusted systems ultimately are demonstrably insecure, because such systems are penetrable and vulnerable. Various embodiments provide a digital communication system that assumes no trust among various network elements, for at least the reason that the digital environment is inherently untrustworthy.

Various embodiments enable the generation of a vast amount of random data from a relatively small initial information set. Various embodiments enable the dynamic alteration of the data set such that the data set is altered unpredictably. In some embodiments, the dynamically altered data set, or a subset thereof, may be provided to or obtained by two or more computing devices, such that the two or more computing devices each store an ephemeral shared data set. In some embodiments, the ephemeral shared data set of the two or more computing devices may be dynamically altered. In some embodiments, alterations of the ephemeral shared data set may be synchronized such that the altered data set remained shared by the two or more computing devices.

Various embodiments enable the generation of a dynamic value by the two or more computing devices. In some embodiments, the dynamic value is generated based on the ephemeral shared data set. In some embodiments, the dynamic value may be used to encrypt a communication of the two or more computing devices.

Various embodiments also improve the security function of any communication network or system because the dynamic shared data set is not transmitted from one computing device to another. Various embodiments also improve the security function of any communication network or system because the dynamically generated value is not transmitted from one computing device to another.

Since a common threat vector is typically theft of credentials such as certificates and key information, rather than use of computing power to decrypt encoded authenticating information, various embodiments improve the security of communications in a communication network. In some embodiments, the dynamic shared data set may exist in one state for a relatively short period of time, which may be minutes, or even seconds. In some embodiments, the dynamic value may be usable to encrypt and decrypt only one communication. This contrasts with the effective duration of certificates from a conventional certifying authority (CA), which may have a duration of up to decades in some cases. The relatively short useful duration and the inherent complexity of the ephemeral shared data set and the dynamic value reduces by orders of magnitude the possibility of such information being guessed, accessed, or "hacked" and then used as a means of attacking the system.

Further details relevant to various embodiments are disclosed in U.S. Provisional Application No. 62/423,593 entitled "Systems and Methods for Multipath Authentication" filed Nov. 17, 2016, U.S. patent application Ser. No. 15/395,336 entitled "Systems and Methods for Multipath Authentication" filed Dec. 30, 2016, and U.S. patent application Ser. No. 15/493,572 entitled "Systems and Methods for Device Verification and Authentication" filed Apr. 21, 2017, all of which are incorporated by reference herein in their entirety.

Various embodiments include systems and methods for managing an ephemeral shared data set stored by two or more computing devices. In various embodiments, the two or more computing devices may include any two endpoint devices in a computing network, such as a user device, a network server, an authentication server, or another computing device. The ephemeral shared data set may be compiled over time, and may be changed by a computing device occasionally, periodically, and/or upon the occurrence of a triggering event. Changing or altering the ephemeral shared data set may include reordering one or more portions of the data set, adding information to the data set, subtracting information from the data set, and/or transforming one or more portions of the ephemeral shared data set. The ephemeral shared data set may include two or more portions. Each portion of the data set may include two or more elements. In some embodiments, a computing device may determine a relationship between two or more elements of an ephemeral shared data set. The relationship between the two or more elements may include a comparative difference between the two or more elements, such as a time difference, a location difference, a positional difference, a color difference, a pitch difference, a frequency difference, or another difference. The relationship between the two or more elements may also include a comparative difference between each of the two or more elements and a third element, such as a relative time, location, position, color, pitch, frequency, or another difference.

In some embodiments, the plurality of files may include a plurality of image files. In various embodiments, the computing devices may use an agreed upon method for altering the ephemeral shared data set that enables both computing devices to alter the ephemeral shared data set while maintaining an identical ephemeral shared data set. In some embodiments, instructions for altering the ephemeral shared data set may be provided to the computing devices by a network element, such as a data set manager (e.g., a data set management device). In some embodiments, the alterations of the ephemeral shared data set may be determined dynamically by the data set manager and/or the computing devices (e.g., "on the fly").

In some embodiments, the data set manager may dynamically generate one or more instructions to alter the ephemeral shared data set. In some embodiments, the instructions may include an instruction to replace the ephemeral shared data set. In some embodiments, the instruction may include an instruction to add a new data set portion. In some embodiments, the instruction may include an instruction to subtract a portion of the ephemeral shared data set. In some embodiments, the instruction may include an instruction to reorder the ephemeral shared data set. In some embodiments, the instruction may include an instruction to transform the ephemeral shared data set.

In various embodiments, performing one or more transformations to the ephemeral shared data set enables the generation of a very large number of unpredictable element values and relationships among data elements from a relatively small number of portions. In various embodiments, simple computations, or computations that are not processor intensive, may generate vast complexity from a relatively small and/or simple starting data set. In contrast to conventional secret information (such as a PM certificate, which is representative of one-dimensional, linear computations), the dynamic data set may be multidimensional (n-dimensional), and may provide vastly greater complexity and conventional secret information by several orders of magnitude. Further, various embodiments may determine relationships between and among elements of the ephemeral shared data set. Performing a transformation on the data set may change the various relationships between and among the data elements. As but one example, and image file may include a number of pixels, and each pixel may be associated with a number of different values, such as location information within the image file, color, hue, saturation, black and white value, and other such pixel information. Even without transformation, the image file may contain a unique set of information. A processor then may perform the transform on one or more of the image files, thereby changing not only the values of the various pixels in the transformed image files, but also numerous relationships among the data elements of the transformed image files and other portions of the data set.

In some embodiments, one of the computing devices (a first computing device) may send an indication to the data set manager that the computing device has a communication to send to a second computing device. In response to the indication from the first computing device, the data set manager may generate instructions to extract one or more elements from the ephemeral shared data set, and may send the extraction instructions to the first and second computing device. According to the instructions, the first and second computing devices may extract the elements from the ephemeral shared data set. In some embodiments, the extraction instructions may include an indication of the element(s) to be extracted. In some embodiments, the extraction instructions may include a rule set that enables each of the first and second computing devices to identify the element(s) of the ephemeral shared data set to be extracted. In some embodiments, the extraction instructions may include an instruction to perform a transformation operation on one or more of the extracted elements. In various embodiments, the extraction instructions may enable the first computing device and the second computing device to dynamically generate a unique set of elements that are shared by the first computing device and the second computing device (i.e., the extracted elements are stored at each of the first computing device and the second computing device), based on elements in the ephemeral shared data set.

In some embodiments, the first computing device may select elements from among the extracted elements. In some embodiments, the first computing device may generate a rule set indicating the selected elements. The rule set may identify the selected elements from among the extracted data elements of the ephemeral shared data set. In some embodiments, the computing device may generate the rule set based on one or more relationships between or among the selected data elements. In some embodiments, the rule set may identify a first element and one or more relationships among the first element and other data elements that enable a computing device to select the elements from the extracted elements based on the identity of the first element and the one or more relationships to the other data elements. The first computing device may send the generated rule set to the second computing device.

As one example, an ephemeral shared data set may include two or more image files, and each image file may include numerous pixels (picture elements). Each image file may be associated with additional data, such as a time stamp or other time information, location information and/or geo-location information where the image was obtained, weather information, and the like. Each pixel may be associated with a large number of information elements, such as a coordinate location in an image, color, intensity, luminosity, and the like. Each pixel may also be associated with the information of its respective image file. Thus, each pixel may be associated with a large number of information elements, which may be considered variables. In some embodiments, the rule set may include information identifying one or more pixels of the ephemeral shared data set. In some embodiments, the rule set may include information identifying one pixel of the ephemeral shared data set, and relationship information that enables the identification of one or more other pixels using the identified first pixel and the relationship information.

The ephemeral shared data set is not limited to image files, and a shared data set may be generated or compiled using data that may include identifiable data elements, and/or in which relationships between or among two or more data elements may be determined. Examples of such data include video files, audio files, biometric samples, location data (e.g., Global Positioning Satellite system data), and the like. Further, a rule set may include information identifying one or more data elements of a component of the ephemeral shared data set. In some embodiments, the rule set may include information identifying one data element and relationship information that enables the identification of one or more other data elements in a data set (e.g., elements selected from the extracted data elements).

In some embodiments, the first computing device may generate a first result based on the selected elements. In some embodiments, the generated result may include a string of data. In some embodiments, the generated result may include a value based on information in the elements selected from the extracted elements of the ephemeral shared data set. In some embodiments, the first computing device may perform a transform of the information of the selected elements, such as generating a hash of values of the information. In some embodiments, the first computing device may generate a data string based on the information of the selected elements and may perform a transform (e.g., generate a hash) of the information of the selected elements to generate the first result.

In various embodiments, a second computing device having the elements extracted from the ephemeral shared data set may receive the rule set from the first computing device, and may use the rule set and the extracted elements of the ephemeral shared data set to select the elements from the extracted elements. For example, the second computing device may apply the rule set to its stored extracted data elements to identify, e.g., pixels and their associated location, order in the data set, numerical values for color, density, etc. In some embodiments, the second computing device may create a data string from the application of the rule set.

In some embodiments, the second computing device may generate a second result based on the selected elements. In some embodiments, the generated result may include a string of data. In some embodiments, the generated result may include a value based on the information in the selected elements of the ephemeral shared data set. In some embodiments, the second computing device may perform a transform of the information of the selected elements, such as generating a hash of values of the information. In some embodiments, the second computing device may generate a data string based on the information of or within the selected elements and may perform a transform (e.g., generate a hash) of the data string to generate the second result.

In some embodiments, the second computing device may encrypt a message using the second result, and the second computing device may send the encrypted message to the first computing device. In some embodiments, the message may include a very small amount of data. In some embodiments, the encrypted message may function as a test message for sending to the first communication device, to enable the first communication device to determine whether the second result generated by the second communication device matches the first result generated by the first communication device.

In some embodiments, the first communication device may receive the encrypted message from the second device, and may attempt to decrypt the message using the first result. For example, the first communication device may initiate a decryption process of the message. The first communication device may determine whether the decryption was successful. In some embodiments, in response to determining that the decryption was not successful, the first communication device may determine that the second computing device is not authenticated. In some embodiments, in response to determining that the decryption was not successful, the first communication device may send a synchronization query to the data set manager. In some embodiments, in response to the synchronization query, the data set manager may then generate new extraction instructions and send the new extraction instructions to the first and second communication devices. In some embodiments, in response to synchronization query, the data set manager, as well as the first and second communication devices, may perform synchronization operations to synchronize the ephemeral shared data set.

In various embodiments, each of the first computing device and the second computing device may select elements from among the extracted elements, and each of the first computing device and the second computing device may generate a rule set. In some embodiments, the elements selected by the first computing device may be different than the elements selected by the second computing device. For example, in some embodiments, the first computing device may generate a first rule set indicating the elements selected by the first computing device. In some embodiments, the second computing device may generate a second rule set indicating the elements selected by the second computing device. In some embodiments, the first computing device may send the first rule set to the second computing device, and the second computing device may send the second rule set to the first computing device.

In some embodiments, the first and/or second rule sets may include instructions/rules for how to combine the selected elements (i.e., elements selected by each device and the elements selected using the rule set from the other computing device) to generate a combined set of selected elements.

In some embodiments, the first computing device may generate a first result based on the elements selected by the first computing device. In some embodiments, the first computing device may select elements from among the extracted elements using the second rule set (from the second computing device). The first computing device may generate a second result from the elements selected using the second rule set. In some embodiments, the first computing device may combine the first result and the second result to generate a combined result.

In some embodiments, the second computing device may generate a third result based on the elements selected by the second computing device. In some embodiments, the first computing device may select elements from among the extracted elements using the first rule set (from the first computing device). The second computing device may generate a fourth result from the elements selected using the first rule set. In some embodiments, the second computing device may combine the third result and the fourth result to generate a combined result. In various embodiments, the combined results generated by each of the first computing device and the second computing device are the same.

In some embodiments, the first and/or second rule sets may include instructions/rules for combining the first and second rule sets to generate a combined rule set. Each computing device may then use the combined rule set to select the elements from among the extracted elements, and may use the selected elements to generate the combined result.

In some embodiments, the second computing device may encrypt a message using the combined result generated by the second computing device, and the second computing device may send the encrypted message to the first computing device. In some embodiments, the first communication device may receive the encrypted message from the second device, and may attempt to decrypt the message using the combined result generated by the first computing device. In response to determining that the decryption was successful, the first computing device may encrypt a communication using the combined result, and may send the encrypted communication to the second computing device. The second computing device may decrypt the communication using the combined result.

Various embodiments may be implemented within a variety of communication systems 100, an example of which is illustrated in FIG. 1. The communication system 100 may include computing devices 102 and 106, and network element 110. In some embodiments, the computing devices 102 and 106 may include a computing device used directly by a user, such as a smart phone, a laptop computer, a desktop computer, and the like. In some embodiments, the computing devices 102 and 106 may include a network device such as router, a smart switch, an IoT router or hub, or another similar device. The computing device 102 may include or be configured to communicate with a data storage 104, and the computing device 106 may include or be configured to communicate with a data storage 108. It will be understood that a user may operate more than one such computing device similar to the computing devices 102 and 106. In some embodiments, the computing devices 102 and 106 may include one or more IoT devices. Non-limiting examples of IoT devices include personal or mobile multimedia players, gaming systems and controllers, smart televisions, set top boxes, smart kitchen appliances, smart lights and lighting systems, smart electricity meters, smart heating, ventilation, and air conditioning (HVAC) systems, smart thermostats, building security systems including door and window locks, vehicular entertainment systems, vehicular diagnostic and monitoring systems, machine-to-machine devices, and similar devices that include a programmable processor and memory and circuitry for establishing wireless communication pathways and transmitting/receiving data via wireless communication pathways. The computing devices 102 and 106 may also include an unmanned, autonomous, semi-autonomous, or robotic vehicle capable of travel of travel on land, sea, air, or in space. The computing devices 102 and 106 may further include a smart firearm or another processor-equipped weapon or weapon system.

In some embodiments, the network element 110 may include a back-end computing device such as a server. The network element 110 may include or be configured to communicate with a data storage 112.

Each of the computing devices 102 and 106 and the network element 110 may communicate with a communication network 114 over a respective communication link 122, 124, and 126. In some embodiments, the communication network 112 may include two or more communication networks. The communication links 122, 124, and 126 may include wired or wireless communication links, and may further include additional devices to facilitate communication between the computing devices 102 and 106, the network element 110, and the communication network 114. Examples of such additional devices may include access points, base stations, routers, gateways, wired and/or wireless communication devices, as well as backhaul communication links that may include fiber optic backhaul links, microwave backhaul links, and other suitable communication links.

In some embodiments, the network element 110 may be configured to manage a data set that may be stored in the data storage 112. In some embodiments, network element 110 may be configured to manage an ephemeral shared data set that may be stored in the data storage 104 of the computing device 102, and the data storage 108 of the computing device 106, as further described below.

In various embodiments, network element 110 may receive data inputs 130 over time. The data inputs 130 may include information that the computing device 130 may use to generate, alter, and/or manage a data set that may be shared with another computing device (e.g., the computing devices 102 and 106). The data inputs 130 may include, for example, images, photographs, video, sound recordings (e.g., music, ambient sound recordings, or another such recording), biometric information inputs (e.g., facial recognition scans, iris scans, DNA samples, a voiceprint recordings, fingerprints, and the like), or any other such data input.

The communication network 112 may include a variety of communication networks, including communication networks within an entity or enterprise, and external communication networks, publicly available communication networks, and combinations of networks as well as internetworks, including the internet. The communication network 112 may support communications using one or more wired and wireless communication protocols. Each of the communication links 120, 122, 124, and 126 may be two-way wired or wireless communication links. Wireless communication protocols may include one or more radio access technologies (RATs). Examples of wireless RATs include 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), and other RATs. Examples of RATs may also include Wi-Fi, Bluetooth, Zigbee, LTE in Unlicensed spectrum (LTE-U), License Assisted Access (LAA), and MuLTEfire (a system that uses LTE on an unlicensed carrier band). Wired communication protocols may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

In some embodiments, the computing devices 102 and 106 and the network element 110 may be part of a secure network, such as an internal enterprise network, a government agency secure network, a virtual private network (VPN), or another similar network environment. In such a secure network, the communication links 122, 124, and 126 may include additional security, such as encryption at one or more layers (i.e., Open Systems Interconnection (OSI) layers), and other implementations to secure communications along the communication links 122, 124, and 126.

While the communication links 122, 124, and 126 are illustrated as single links, each of the communication links may include a plurality of wired or wireless links, such as plurality of frequencies or frequency bands, each of which may include a plurality of logical channels. Additionally, each of the various communication links 122, 124, and 126 may utilize more than one communication protocol.

Figure 2:
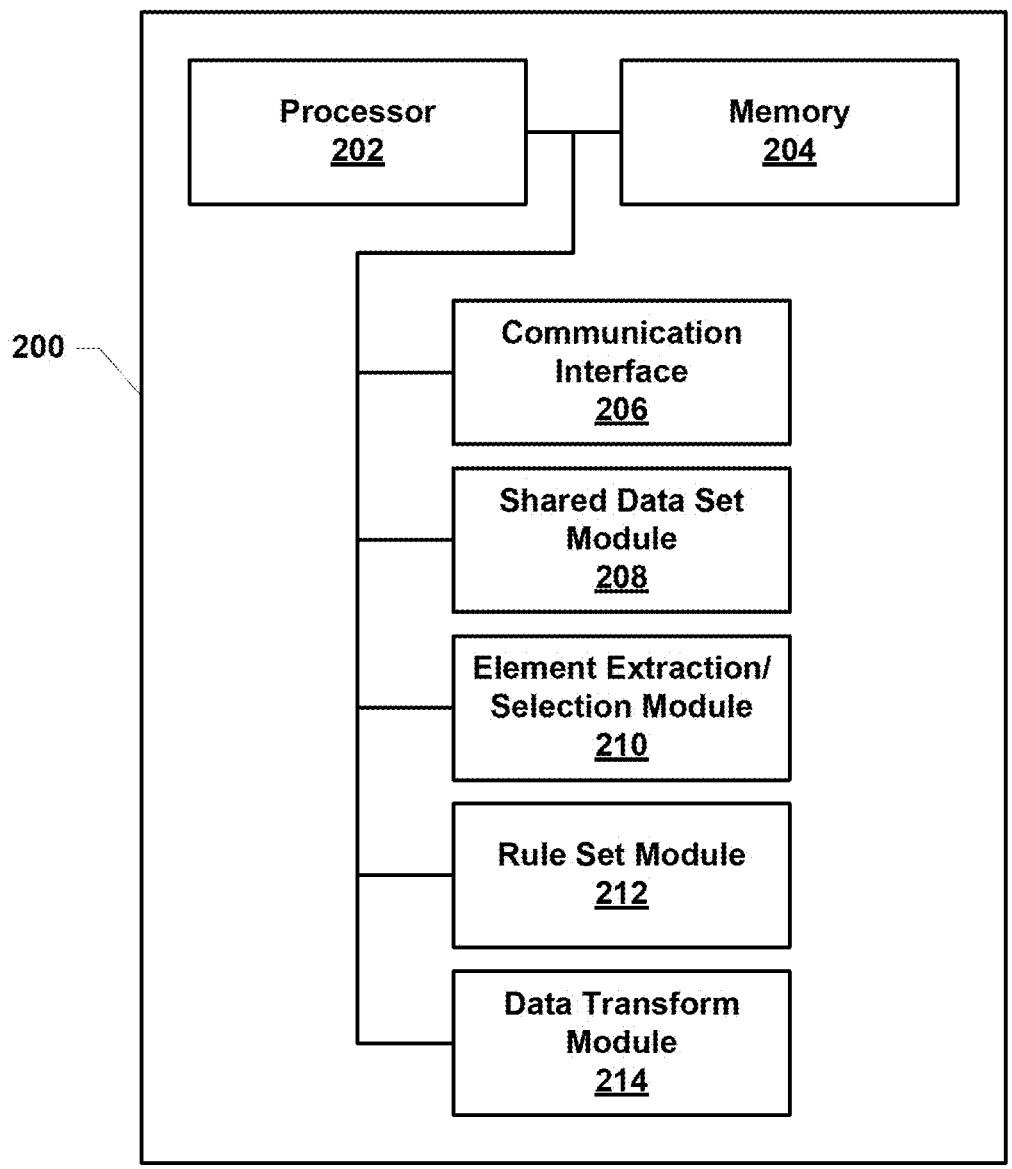
FIG. 2 is a component block diagram of a communication device suitable for use with various embodiments.

FIG. 2 is a component block diagram of a computing device 200 suitable for implementing various embodiments. With reference to FIGS. 1 and 2, in various embodiments, the computing device 200 may be similar to the computing devices 102, 106, and 110.

The computing device 200 may include a processor 202. The processor 202 may be configurable with processor-executable instructions to execute operations of the various embodiments, a specialized processor, such as a modem processor, configurable with processor-executable instructions to execute operations of the various embodiments in addition to a primary function, a dedicated hardware (i.e., "firmware") circuit configured to perform operations of the various embodiments, or a combination of dedicated hardware/firmware and a programmable processor.

The processor 202 may be coupled to memory 204, which may be a non-transitory computer-readable storage medium that stores processor-executable instructions. The memory 204 may store an operating system, as well as user application software and executable instructions. The memory 204 may also store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 may also store instructions associated with one or more protocol stacks. A protocol stack generally includes computer executable instructions to enable communication using a radio access protocol or communication protocol.

The processor 202 may also communicate with a variety of modules for units configured to perform a variety of operations, as further described below. For example, the processor 202 may communicate with a communication interface 206, a shared data set module 208, and element extraction/selection module 210, a rule set module 212, and a data transform module 214. The modules/units 206-214 may be implemented on the computing device 200 in software, in hardware, or in a combination of hardware and software, including a firmware chip, system-on-a-chip (SOC), dedicated hardware (i.e., firmware) circuit configured to perform operations of the various embodiments, or a combination of dedicated hardware/firmware and a programmable processor. The processor 202, the memory 204, and the various modules/units 206-214 may communicate over a communication bus or any other communication circuitry or interface.

The communication interface 206 may include a network interface that may enable communications with a communication network (e.g., the communication network 114). The communication interface 206 may include one or more input/output (I/O) ports through which a connection, such an Ethernet connection, a fiber optic connection, a broadband cable connection, a telephone line connection, or other types of wired communication connection may be provided. The communication interface 206 may also include a radio unit that may enable radio frequency communication.

The shared data set module 208 may receive from the communication interface 206 information for use as a shared data set (e.g., from the network element 110). The shared data set module 208 may be configured to alter the shared data set according to instructions from the processor 202.

The element extraction/selection module 210 may be configured to extract and/or select one or more data elements from the shared data set.

The rule set module 212 may be configured to generate a rule set identifying the one or more data elements. The rule set module 212 may also be configured to parse or analyze a rule set received from another computing device so that the element extraction/selection module may use the received rule set to extract and/or select one or more data elements from the shared data set.

The data transform module 214 may be configured to perform one or more data transformations on one or more elements of the shared data set, one or more extracted elements, and/or one or more selected elements. The data transform module 214 may also be configured to perform operations to alter the shared data set.

Figure 3:
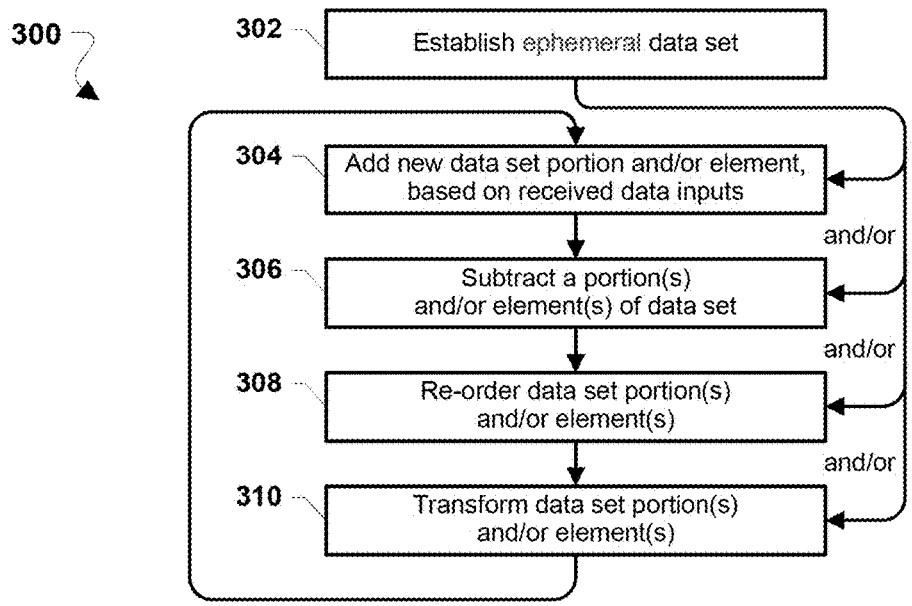
FIG. 3 is a process flow diagram illustrating a method 300 of managing an ephemeral shared data set according to various embodiments.

FIG. 3 illustrates a method 300 of managing an ephemeral shared data set according to various embodiments. With reference to FIGS. 1-3, the method 300 may be implemented by a processor (e.g., the processor 202 and/or the like) of a computing device (e.g., the computing devices 102 and 106 and the network element 110).

In block 302, the processor may establish a data set. For example, the processor may receive data inputs (e.g., the data inputs 130) and may establish the data set based on one or more of the data inputs. The data inputs and the data set are further described below.

After the data set is established, the processor may perform one or more operations to alter the data set.

In block 304, the processor may to add a new data set portion and/or a new data element based on the received data inputs.

Additionally or alternatively, the processor may subtract one or more portions and/or one or more elements of the data set in block 306.

Additionally or alternatively, the processor may re-order one or more portions and/or one or more elements of the data set in block 308.

Additionally or alternatively, the processor may perform a transform of one or more portions and/or one or more elements of the data set in block 310.

Transforming an element and/or a portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the ephemeral shared data set may include transcoding data elements (e.g., transforming audio data into visual data or text). As another example, transforming an element and/or a portion of the ephemeral shared data set may include performing one or more mathematical functions to transform the element and/or portion.

Figure 4:
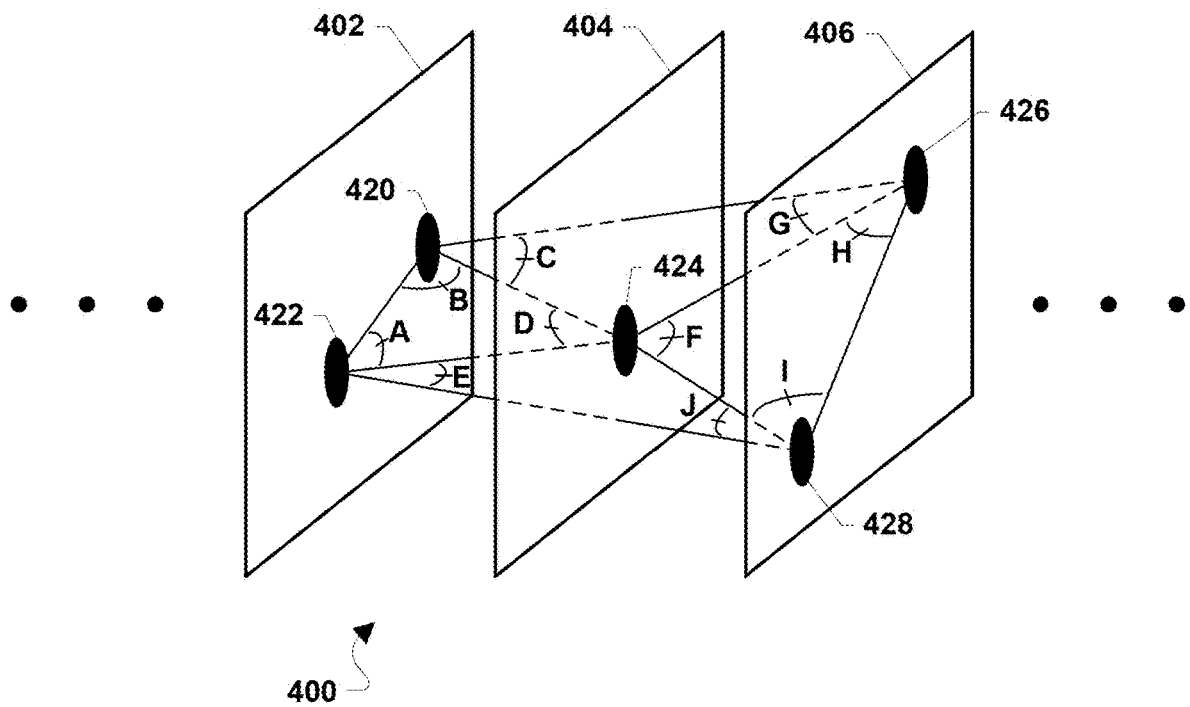
FIG. 4 illustrates relationships among elements of portions of a data set 500 according to various embodiments.

FIG. 4 illustrates one example of a data set 400, according to some embodiments. With reference to FIGS. 1-4, in some embodiments, the data set may include two or more portions. Each portion of the data set may include one or more elements. In some embodiments, the portions of the data set may include a discrete constituent, such as an image, a photograph, video, sound recording, a biometric input, or another such discrete constituent. In various embodiments, the data set, or one or more portions and/or elements of the data set, may be used to generate an ephemeral shared data set that may be stored at two or more computing devices (e.g., the computing devices 102 and 106)

The data set 400 may include one or more portions, such as portions 402, 404, and 406. Each of the portions 402, 404, and 406 may include one or more elements. For example, portion 402 may include elements 420 and 422, portion 404 may include element 424, and portion 406 may include elements 426 and 428. In some embodiments, the portions 402, 404, and 406 may include discrete constituents, such as photographs, sound recordings, fingerprints, biometric data, or other discrete portions.

In some embodiments, the data set 400 may be built up over time. For example, a computing device (e.g., the network element 110) may receive data inputs (e.g., the data inputs 130) and may build up a data set 400 over time using the received data inputs. In some embodiments, the processor may provide some or all of the data set 400 to two or more computing devices for use as an ephemeral shared data set.

In various embodiments, the elements 420-428 may include information that enables the identification or indexing of each element within a portion. For example, an element may include information identifying a location, position, and/or time of the element within its portion, or any other information that allows the indexing or identification of each selected element.

In various embodiments, the portions 402-406 and/or the elements 420-428 may include data from which one or more relationships to at least one other data element may be determined. For example, the 402-406 and/or the elements 420-428 may be associated with a timestamp. As another example, portions and/or elements may be associated with a variety of data, such as a location, a position, a color, a pitch, a frequency, a biometric aspect, or another aspect of the portion and/or element. The relationship between the two or more elements may include a comparative difference between the two or more elements, such as a time difference, a location difference, a positional difference, a color difference, a pitch difference, a frequency difference, a biometric difference, or another difference.

As another example, the elements 420-428 may have different positions or locations within a portion, or between different portions. The elements 420-428 may also be associated with a different time, as well as with different positions or locations, relative to two or more other elements. In some embodiments, three or more elements may define a relationship of one element to two or more other elements. For example, the position/location differences among elements 420, 422, and 424 may define three angles, angle A, angle B, and angle D. Similarly, the relative position/location and/or time differences among elements 420, 422, 424, 426, and 428 may define additional angles, angles C, E, F, G, H, I, and J. In various embodiments, a relationship may be a relative difference in time, space, distance, or another informational difference, within a portion, among or between portions, and/or within the data set 400.

A data set such as the data set 400 may be made up of a wide variety of portions and/or elements. FIGS. 5A-5D illustrate exemplary data sets 500a, 500b, 500c, and 500d. A data set may include one or more of a variety of types of data, and the examples illustrated in FIGS. 5 and 5A-5D are intended to illustrate the variety of data types and not as limitations.

For example, the data set 500a may include fingerprints 502a, 504a, and 505a. The fingerprints 502a-505a may be captured, for example, by a biometric scanning device such as a fingerprint scanner. The fingerprints 502a-506a may be captured over time, such that the fingerprints 502a-506a each constitute a portion of the data set 500a. A processor of a computing device (e.g., the computing devices 102-108) may select elements from the portions (e.g., the fingerprints 502a-506a) of the data set 500a, such as elements 520a-538a. In some embodiments, the elements 520a-538a may include fingerprint minutiae. The elements 520a-538a may include information that enables a processor of a computing device to identify or index each element within a portion (e.g., within one of the fingerprints 502a-506a), such as information identifying a location or position of the element within its portion. Further, each portion may be associated with a timestamp or another time element.

The portions (e.g., the fingerprints 502a-506a) and/or the elements 520a-538a may include data from which one or more relationships to at least one other data element may be determined, such as position, location, and/or time information. In some embodiments, the portions and/or elements may include data from which one or more relationships among the elements may be determined. In some embodiments, the relationships may be based on one or more comparative differences between or among the elements.

As another example, the data set 500*b* may include sound recordings 502*b*, 504*b*, and 506*b*. The sound recordings may be captured, for example, by a microphone or similar device, or the sound recordings may be received electronically by a processor of a computing device (e.g., the computing devices 102-108) from such a device. The sound recordings 502*b*-506*b* may be captured over time, and may include or be associated with time information. Each of the sound recordings 502*b*-506*b* may constitute a portion of the data set 500*b*. Additionally, or alternatively, a single recording (e.g., one of 502*b*, 504*b*, or 506*b*) may be divided into portions, for example, portions of a certain time duration, portions divided by frequency range, portions divided by amplitude ranges, and other divisions.

A processor of a computing device may select elements from the portions of the sound recordings 502*b*-506*b*, such as elements 520*b*-530*b*. The elements 520*b*-530*b* may include information that enables the identification or indexing of each element within a sound recording, such as information identifying a location or position of the element within its portion. Each element 520*b*-530*b* may be associated with timestamp or another time element and/or other information, such as frequency, a pitch, and amplitude, a rate of attack, a rate of decay, a duration of sustain, The portions (e.g., the one or more sound recordings 502*b*) and/or the elements 520*b*-530*b* may include data from which one or more relationships to at least one other data element may be determined, such as position, location, and/or time information. In some embodiments, the portions and/or elements may include data from which the processor of a computing device may determine one or more relationships among the elements. In some embodiments, the relationships may be based on one or more comparative differences between or among the elements.

Figure 5A:
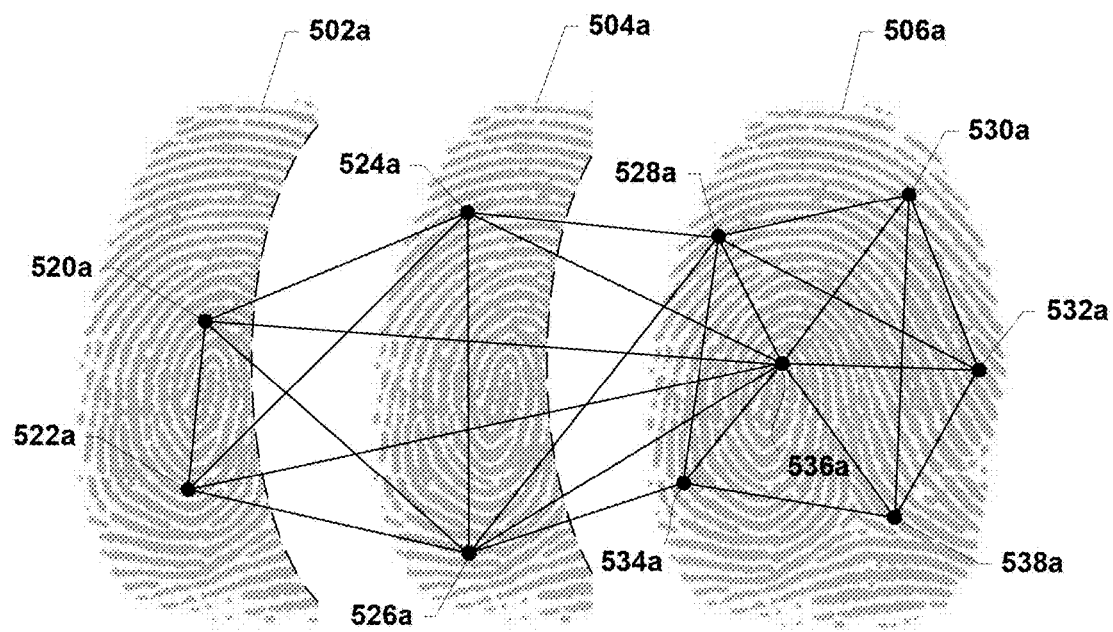
FIGS. 5A-5D illustrate relationships among elements of portions of ephemeral shared data sets 500a-500d according to various embodiments.
Figure 5B:
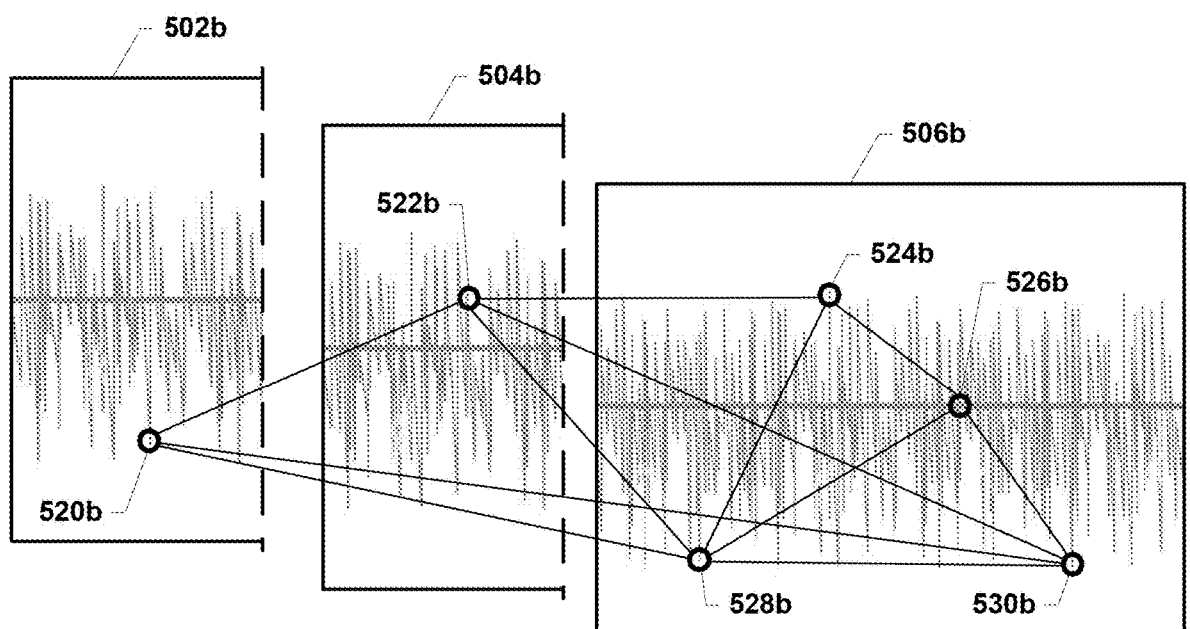
Figure 5C:
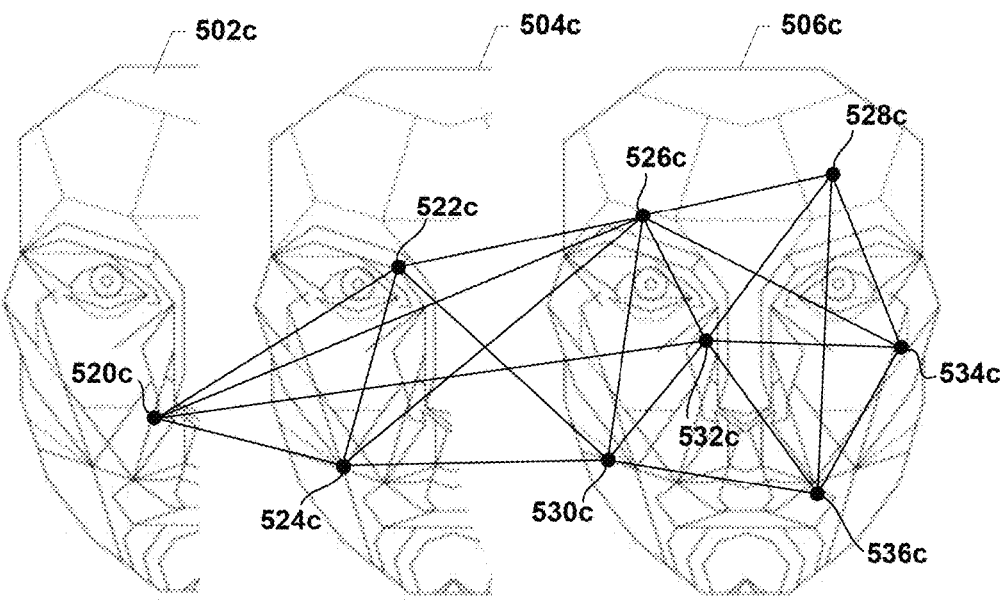
Figure 5D:
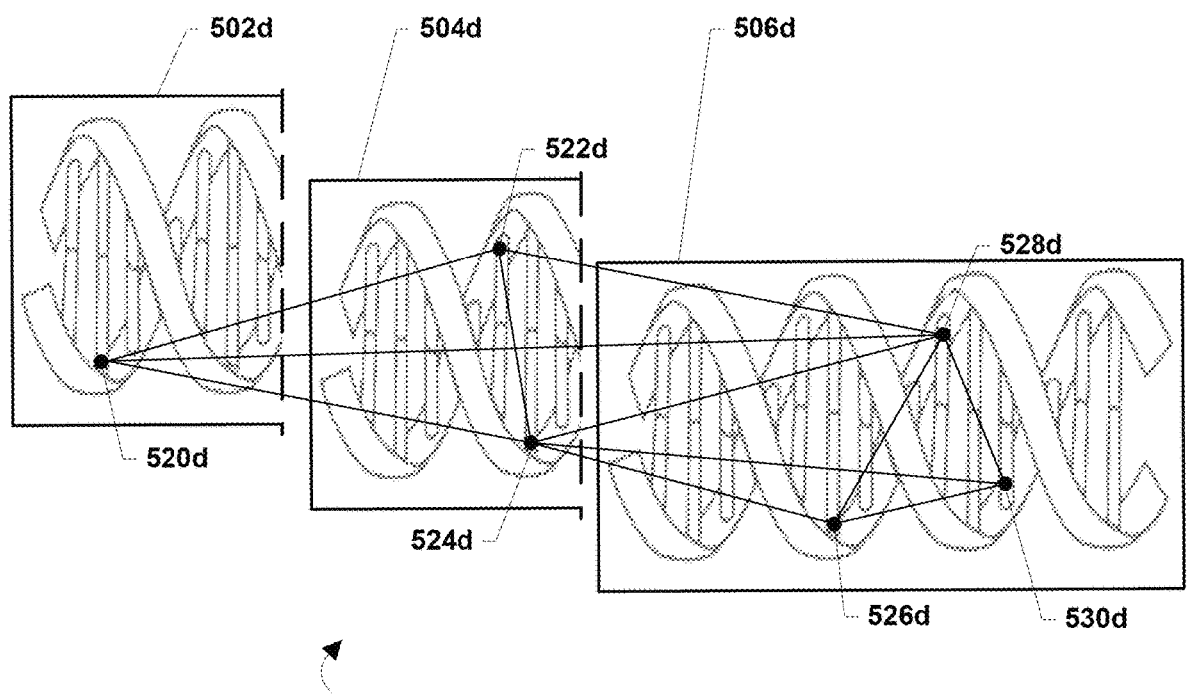

As another example, the data set 500*c* may include images 502*c*, 504*c*, and 506*c*. The images 502*c*-506*c* may be of, for example, a face as illustrated in FIG. 5C, but in various embodiments the images 502*a*-506*c* may be any images. The images 502*a*-506*c* may be captured, for example, by a camera or another image receiving device. The images 502*a*-506*c* may be captured over time, such that the images 502*a*-506*c* each constitute a portion of the data set 500*a*. A processor of a computing device (e.g., the computing devices 102-108) may select elements from the portions (e.g., the images 502*a*-506*c*) of the data set 500*c*, such as elements 520*c*-536*c*. For example, the processor of the computing device may select the elements 520*c*-536*c* using a facial recognition or other similar system. The elements 520*c*-536*c* may include information that enables a processor of a computing device to identify or index each element within a portion (e.g., within one of the images 502*a*-506*c*), such as information identifying a location or position of the element within its portion. Further, each portion may be associated with a timestamp or another time element.

The portions (e.g., the images 502*a*-506*c*) and/or the elements 520*c*-536*c* may include data from which one or more relationships to at least one other data element may be determined, such as position, location, and/or time information. In some embodiments, the elements 520*c*-536*c* may be associated with image information, such as color, tint, hue, grayscale, RGB information, Pantone color number, digital color code (e.g., hypertext markup language color code), saturation, brightness, contrast, or other image information. In some embodiments, the portions and/or elements may include data from which one or more relationships among the elements may be determined. In some embodiments, the relationships may be based on one or more comparative differences between or among the elements. In some embodiments, the comparative differences may include differences in image information, including relative, linear, and/or numerical differences in information indicating color, tint, hue, etc.

As another example, the data set 500*d* may include one or more biometric data units or constituents, such as DNA samples 502*d*, 504*d*, and 506*d*. Biometric data may be captured by an appropriate scanner or capture device and received by a processor of a computing device (e.g., the computing devices 102-108). The biometric data may be captured over time, and may include or be associated with time information. The data set 500*d* may include two or more biometric data constituents or units, each of which may constitute a portion of the data set (e.g., two or more discrete biometric samples). Additionally or alternatively, a biometric sample may be divided into portions, which divisions may be determined based on the information available in the biometric sample. For example, the DNA samples 502*d*, 504*d*, and 506*d* may be divided into portions of a certain base-pair length or number, a certain length of the DNA backbone, by type of nucleotide (e.g., adenine, guanine, cytosine, or thymine), by type of base pair (e.g., adenine-thymine, cytosine-guanine), or another division.

A processor of a computing device may select elements from the portions of the biometric data unit 500*d*, such as elements 520*d*-530*d*. The elements 520*d*-530*d* may include information that enables the identification or indexing of each element within a biometric data, such as information identifying a location or position of the element within its portion, such as a position along the DNA strand 502*d*. Each element 520*d*-530*d* may be associated with timestamp or another time element.

The portions (e.g., the one or more biometric data units 502*d*) and/or the elements 520*d*-530*d* may include data from which one or more relationships to at least one other data element may be determined, such as position, location, and/or time information. In some embodiments, the portions and/or elements may include data from which the processor of a computing device may determine one or more relationships among the elements. In some embodiments, the relationships may be based on one or more comparative differences between or among the elements.

Figure 6A:
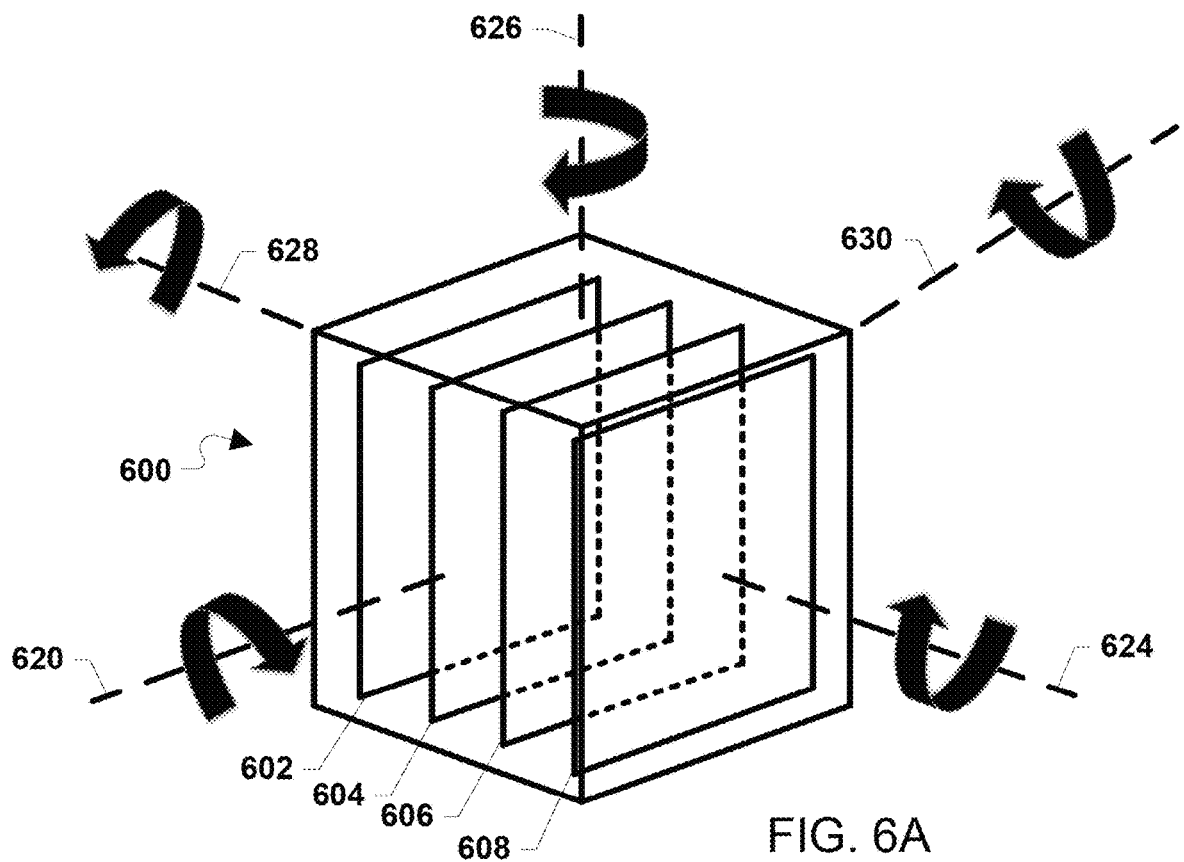
FIGS. 6A-6C illustrate representations of methods of managing an ephemeral shared data set according to various embodiments.
Figure 6B:
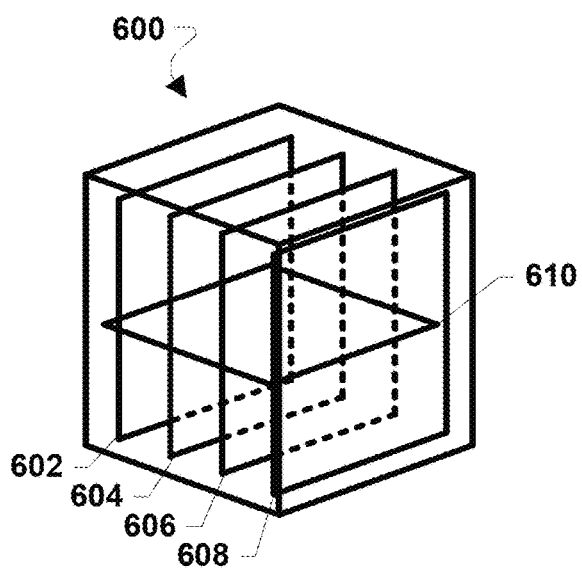
Figure 6C:
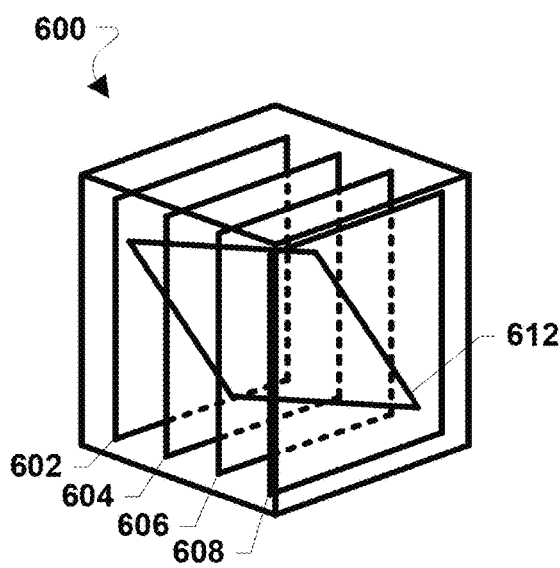

FIGS. 6A-6C illustrate representations of methods of managing a data set according to various embodiments. With reference to FIGS. 1-6C, a data set 600 may include two or more portions 602, 606, 606, and 608. The portions 602-608 may include data elements (e.g., the elements 420-428, 520*a*-538*a*, 520*b*-530*b*, 520*c*-536*c*, and 520*d*-530*d*). Further, the portions 602, 606, 606, and 608 may be associated with different times (e.g., were obtained at different times, or are associated with different time stamp information).

A processor (e.g., the processor 202 and/or the like) of a computing device (e.g., the computing devices 102 and 106 and the network element 110) may perform a transform on the data set 600 to change one or more values of the data elements in the data set. As one example, the portions 602, 606, 606, and 608 may be image files. The processor may rotate the data set 600, or any of the portions 602-608, along one or more axes 620, 624, and 626. The processor may also rotate the data set 600 along an edge 628. The processor may also rotate the data set 600 along an axis 630 extending from a "corner" of the data set to a "center" of the data set. Any of the rotations may alter one or more values of elements of the portions 602-608. The rotation(s) may also alter one or more relationships among the values of elements of the portions 602-608. By performing a transform on the data set 600, the processor may generate a large number of changes to the values of the data elements of each of the portions 602-608. The changed values may provide a large number of highly unpredictable values from even a relatively small data set.

In some embodiments, the processor may add a new portion to, or may modify a portion present in, the data set 600. In some embodiments, the processor may add or modify a portion so that relationships between the elements of the added/modify portion and other portions of the data set are irregular and thus difficult to predict. For example, in some embodiments, the processor may add or modify the portion so that the added/modify portion has a different relative orientation or other relationship to other portions of the data set. For example, the processor may add portion 610 to the data set 600 in an orientation that is, for example, perpendicular to the portions 602-608. As another example, the processor may add portion 612 to the data set 600 an orientation that is at an acute angle to the portions 602-608. The irregular, unpredictable relationships among data elements of the portions 602-612 may provide a large number of highly unpredictable values from even a relatively small data set.

As noted above, transforming an element and/or a portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the ephemeral shared data set may include transcoding data elements (e.g., transforming audio data into visual data or text). As another example, transforming an element and/or a portion of the ephemeral shared data set may include performing one or more mathematical functions to transform the element and/or portion. As another example, transforming an element and/or a portion of the ephemeral shared data set may include changing a size or shape, distorting a share, performing a skew, a stretch, or another dimensional change on an element and/or portion of the data set. As noted above, transforming an element and/or portion of the data set may change not only a value of the element and/or portion, the may also change one or more relationships of the transformed element and/or portion to other elements and/or portions of the data set.

Figure 6D:
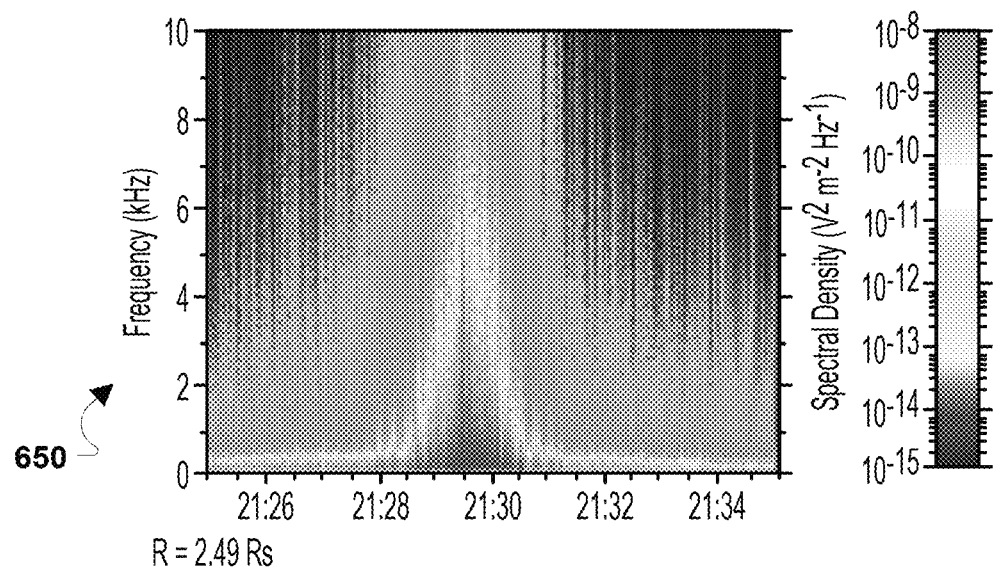
FIG. 6D illustrates a transformation of a first data format or type to a second data format or type.
Figure 6D:
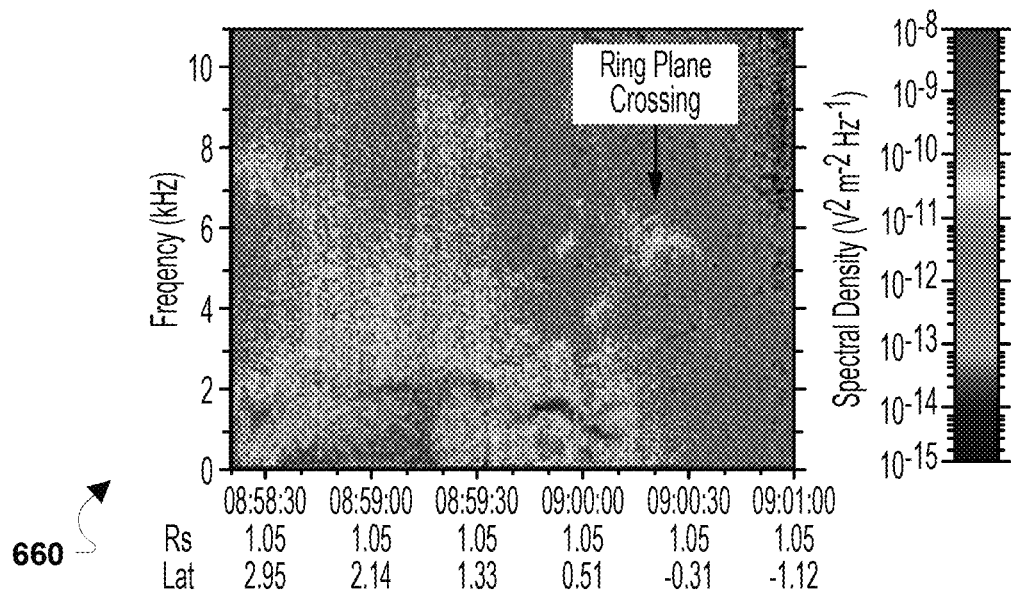

As another example, transforming an element and/or a portion of a data set (e.g., the data set 600) may include performing one or more operations to transcode data elements from one data format or type to another data format or type. FIG. 6D illustrates two representations 650 and 660 of a transformation of a first data format or type to a second data format or type. Representations 650 and 660 illustrate transformations of audio data into visual data, specifically spectrograms of data collected by the NASA Cassini spacecraft as it crossed the plane of Saturn's rings. The spectrograms 650 and 660 illustrate a transformation of audio data into visual data. This is merely one example, and in various embodiments, there any data format or type may be transformed into another data format or type.

In various embodiments, performing one or more transformations to the data set 600 enables the processor to generate a very large number of unpredictable element values and relationships among data elements from a relatively small number of portions. For example, in a case in which the portions 602-612 represent image files, each image file may include a large number of pixels, and each pixel may be associated with a number of different values, such as location information within the image file, color, hue, saturation, black and white value, and other such pixel information. Even without transformation, each image file of a series image files may contain a unique set of information. For example, each image in a series of images captured from a camera aimed at a highway will include a unique selection of vehicles, at different positions on the road, with different environmental conditions (e.g., cloud formations, sunlight, darkness, solar glare, shadows, etc.). The processor then may perform the transform on one or more of the image files, thereby changing not only the values of the various pixels in the transformed image files, but also numerous relationships among the data elements of the transformed image files and other portions of the data set.

Figure 7:
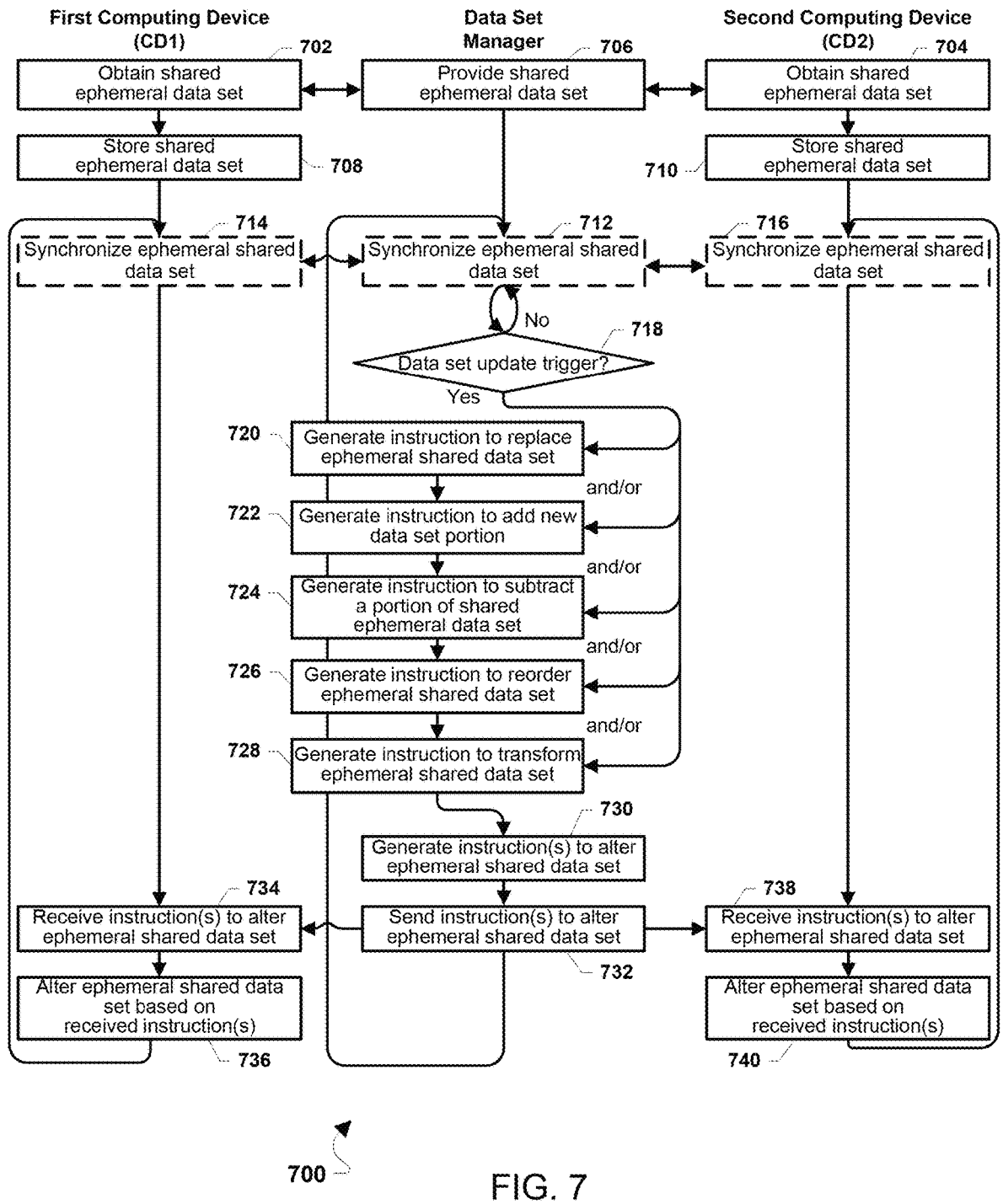
FIG. 7 illustrates a method 700 of managing synchronization of an ephemeral shared data set according to various embodiments.

FIG. 7 illustrates a method 700 of managing synchronization of an ephemeral shared data set according to various embodiments. With reference to FIGS. 1-7, the method 700 may be implemented by a processor (e.g., the processor 202 and/or the like) of a computing device (e.g., the computing devices 102 and 106 and the network element 110). In various embodiments, the dynamic (e.g., ephemeral) shared data set may exist in one state for a relatively short period of time, which may be, for example, minutes, or seconds. The relatively short duration and the inherent complexity of any state of the dynamic shared data set reduces by orders of magnitude the possibility of such information being guessed, accessed, or "hacked" and then used as a means of attacking the system.

In block 702, a processor of a first computing device (CD1) (e.g., the computing device 102, 106) may obtain an ephemeral shared data set.

In block 704, a processor of a second computing device (CD2) (e.g., the computing device 102, 106) may obtain the ephemeral shared data set.

In block 706, a processor of a data set manager (e.g., data set management device, for example, the network element 110) may provide the ephemeral shared data set to CD1 and CD2. In some embodiments, the ephemeral shared data set may include some or all of a data set stored at and managed by the data set manager (e.g., the data set 400, 500a, 500b, 50c, 500d, and 600).

In block 708, the processor of CD1 may store the ephemeral shared data set (e.g., in the storage 104). In block 710, the processor of CD2 may store the ephemeral shared data set (e.g., in the storage 108).

In optional block 712, the processor of the data set manager may perform one or more operations to synchronize the ephemeral shared data set. In optional block 714, the processor of CD1 may perform one or more operations to synchronize the ephemeral shared data set. In optional block 716, the processor of CD2 may perform one or more operations to synchronize the ephemeral shared data set. In various embodiments, the synchronization operations of blocks 712, 714, and 716 may be initiated by the data set manager, CD1, or CD2. The synchronization operations of block 712, 714, and 716 may include the transmission and/or exchange of one or more messages indicating the status and/or state of the ephemeral shared data set stored at each of the data set manager, CD1, and CD2. The synchronization operations of block 712, 714, and 716 may include performing by the processor of the data set manager, CD1, and CD2, one or more analyses of their respective stored ephemeral shared data sets, such as a determining a checksum, performing a hash, and the like.

In determination block 718, the processor of the data set manager may determine whether a data set update trigger has occurred. For example, the processor may determine whether a period of time has elapsed. As another example, the processor may determine whether a trigger event has occurred. The trigger event may include, for example, using an ephemeral shared data set in an authentication process, such as extracting element(s) from ephemeral shared data set, determining a value from the element(s), etc., as further described below. In some embodiments, the trigger event may include, for example, using an ephemeral shared data set in an encryption process, as further described below. The trigger event may include, for example, a request from one or more computing devices to update the ephemeral shared data set.

In response to determining that the data set update trigger has not occurred (i.e., determination block 718="No"), the processor of the data set manager may again perform operations to synchronize the ephemeral shared data set in optional block 712. The processors of CD1 and CD2 may also perform operations to synchronize the ephemeral shared data set in optional block 714 and 716, respectively.

In response to determining that the data set update trigger has occurred (i.e., determination block 718="Yes"), the processor may perform one or more operations to dynamically alter the ephemeral shared data set.

For example, the processor of the data set manager may generate an instruction to replace the ephemeral shared data set in block 720. In some embodiments, the processor of the data set manager may determine the replacement (new) data set. In some embodiments, the replacement data set may include one or more portions of the data set managed by the data set manager.

Additionally or alternatively, the processor of the data set manager may generate an instruction to add a new data set portion in block 722. In some embodiments, the new data set portion may be based on received data inputs (e.g., the data inputs 130). In some embodiments, the processor of the data set manager may generate the new data set portion to be added. In some embodiments, the generated instructions may include instructions enabling the generation of the new data set portion (which may, e.g. be sent to CD1 and CD2, as described below).

Additionally or alternatively, the processor of the data set manager may generate an instruction to subtract a portion of the ephemeral shared data set in block 724.

Additionally or alternatively, the processor may generate an instruction to reorder the ephemeral shared data set in block 726. For example, reordering the ephemeral shared data set may include placing one or more portions of the ephemeral shared data set into a different time, location, position, or other difference relative to other portions of the ephemeral shared data set.

Additionally or alternatively, the processor may generate an instruction to transform the ephemeral shared data set in block 728. For example, the processor may generate an instruction to transform one or more elements and/or one or more portions of the ephemeral shared data set. In various embodiments, transforming a portion and/or an element of the ephemeral shared data set portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the ephemeral shared data set may include transcoding data elements (e.g., transforming audio data into visual data or text). As another example, transforming an element and/or a portion of the ephemeral shared data set may include performing one or more mathematical functions to transform the element and/or portion.

In block 730, the processor may generate one or more instructions to alter the ephemeral shared data set. The one or more instructions may be based on the instruction to replace the ephemeral shared data set, the instruction to add a new data set portion (and/or the generated new data set portion), the instruction to subtract a portion of the ephemeral shared data set, the instruction to re-order the ephemeral shared data set, and/or the instruction to transform the ephemeral shared data set.

In block 732, the processor of the second computing device may send the one or more instructions to alter the ephemeral shared data set to CD1 and CD2.

In block 734, the processor of CD1 may receive the one or more instructions to alter the ephemeral shared data set.

In block 736, the processor of CD1 may alter its stored copy of the ephemeral shared data set based on the received one or more instructions.

In block 738, the processor of CD2 may receive the one or more instructions to alter the ephemeral shared data set.

In block 740, the processor of CD2 may alter its stored copy of the ephemeral shared data set based on the received one or more instructions.

The processors of the data set manager, CD1, and CD2 may then perform operations to synchronize the ephemeral shared data set, in optional block 712, 714, and 716, respectively.

In some embodiments, a computing device (e.g., CD1, CD2) may determine that its ephemeral shared data set is out of synchronization, and the computing device may perform operations to synchronize the ephemeral shared data set stored at the computing device. For example, the computing device may lose network connectivity for a period of time, maybe powered off, or may otherwise be out of or beyond network communication. In some embodiments, the data set manager may store one or more previous instructions to alter the ephemeral shared data set. In some embodiments, synchronization operations performed by a computing device may include determining that the computing device has not performed one or more instructions to alter the ephemeral shared data set. For example, the computing device may exchange one or more synchronization messages with the data set manager when the computing device reestablishes a communication link with the communication network, and based on information in the one or more synchronization messages the computing device may determine that its stored version of the ephemeral shared data set is out of synchronization. In some embodiments, the computing device may request that the data set manager send to the computing device the unperformed instructions to alter the ephemeral shared data set. The computing device may then perform the received and as-yet unperformed instructions to alter its version of the ephemeral shared data set, to bring the ephemeral shared data set stored at the computing device into synchronization.

Figure 8A:
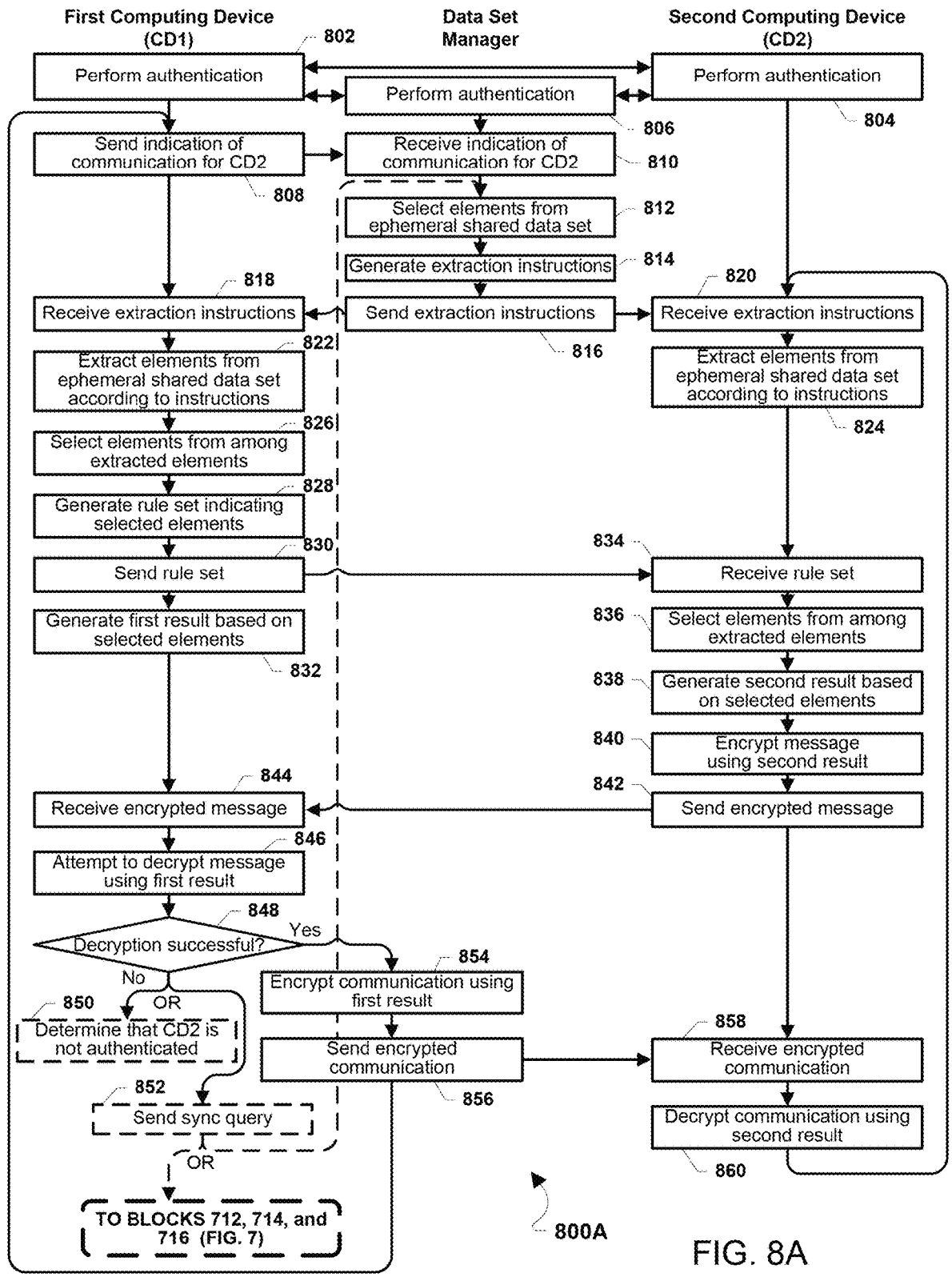
FIG. 8A illustrates a method 800A for protecting a communication according to various embodiments.

FIG. 8A illustrates a method 800A for protecting a communication according to various embodiments. With reference to FIGS. 1-8A, the method 800A may be implemented by a processor (e.g., the processor 202 and/or the like) of a computing device (e.g., the computing devices 102 and 106 and the network element 110).

In block 802, the processor of a first computing device (CD1)(e.g., the computing device 102) may perform operations to authenticate a second computing device (CD2)(e.g., the computing device 106) and a data set manager (e.g., a data set management device, for example, the network element 110). In block 804, the processor of CD2 may perform operations to authenticate CD1 and the data set manager. In block 806, the data set manager may perform operations to authenticate CD1 and CD2. Examples of applicable operations are described U.S. patent application Ser. No. 15/493,572 entitled "Systems and Methods for Device Verification and Authentication" filed Apr. 21, 2017.

In block 808, the processor of CD1 may send an indication to the data set manager that CD1 has a communication to send to CD2.

In block 810, the processor of the data set manager may receive the indication from CD1.

In block 812, the processor of the data set manager may select elements from a shared data set. The shared data set may be stored at the data set manager, and at CD1 and CD2 so that each of CD1 and CD2 has a copy of the shared data set. In some embodiments, the processor of the data set manager may select two or more elements from among the one or more portions of the shared data set. For example, the processor of the first computing device may select two or more elements from among the shared data sets 400 and 500a-500d and 600 (e.g., the elements 420-428, 520a-538a, 520b-530b, 520c-536c, and 520d-530d).

In block 814, the processor of the data set manager may generate extraction instructions. The extraction instructions may provide instructions to another computing device (e.g., CD1, CD2) for extracting data elements from a shared data set. In some embodiments, the extraction instructions may include a rule set that enables the processor of the receiving computing device (e.g., CD1, CD2) to identify the element(s) selected by the processor of the data set manager from the shared data set stored at the receiving computing device. In some embodiments, the extraction instructions may include an instruction to perform a transformation operation on one or more of the extracted elements. In some embodiments, the extraction instructions may include an instruction to perform a transformation operation on one or more portions of the shared data set, or on the entire shared data set, before or after extracting a data element from the shared data set. As the one example, the instruction instructions may include a first instruction to select a first element, a second instruction to perform a specified transformation on the first element, the third instruction to perform a transformation of the shared data set, a fourth instruction to select a second element, a fifth instruction to perform a transformation of the second element, etc.

In some embodiments, the extraction instructions may include a rule set that enables the processor of the receiving computing device (e.g., CD1, CD2) to extract the elements based on relationships among the elements. For example, the processor of the data set manager may determine one or more relationships between the selected two or more elements. In some embodiments, the relationship(s) may be based on one or more comparative or relational differences between or among the elements, such as those described above with respect to data sets 400 and 500a-500d.

In various embodiments, the extraction instructions may enable CD1 and CD2 to dynamically generate a unique set of elements (the extracted data elements) that are uniquely shared by CD1 and CD2, based on elements in the shared data set.

In block 816, the processor of the data set manager may send the extraction instructions to CD1 and CD2.

In block 818, the processor of CD1 may receive the extraction instructions from the data set manager. In block 820, the processor of CD2 may receive the extraction instructions from the data set manager.

In block 822, the processor of CD1 may extract elements from the ephemeral shared data set stored at CD1 according to the instructions. In block 824, the processor of CD2 may extract elements from the ephemeral shared data set stored at CD2 according to the instructions.

In some embodiments, the operations of blocks 822 and 824 may include performing a transform of the extracted elements. For example, the processor of CD1 and/or CD2 may transform an element of an image or a video file (e.g., include rotating, flipping, inverting, shifting a position, shifting a color, applying a filter or preset transformation, or another similar operation). As another example, the processor of CD1 and/or CD2 may transform an element of a music or audio file (e.g., raising or lowering pitches, reversing the content of the file, transforming the content along a selected axis, adding an audio effect such as reverb, distortion, flanging, and the like, or another similar operation). As another example, the processor of CD1 and/or CD2 may transcode data elements from one format or data type to another format or data type. As another example, the processor of CD1 and/or CD2 may performing one or more mathematical functions to transform the element.

In block 826, the processor of CD1 may select one or more elements from among the extracted elements.

In block 828, the processor of CD1 may generate a rule set indicating the selected elements. For example, the processor of CD1 may select one or more elements from one or more portions of the shared data set, and may generate the rule set identifying the selected two or more elements. In some embodiments, the processor of CD1 may determine one or more relationships between the selected two or more elements, and may generate the rule set based on the determined one or more relationships between the selected two or more elements. In some embodiments, the relationship(s) may be based on one or more comparative or relational differences between or among the elements, such as those described above with respect to shared data sets 400 and 500a-500d. In some embodiments, the rule set may indicate a number system to be used in identifying and selecting elements from the shared data set, such as decimal, octal, hexadecimal, etc. In some embodiments, the rule set may indicate an encryption protocol to be used by CD1 and CD2. In various embodiments, the rule set may indicate two or more encryption protocols to be used, so that the encryption protocol employed by CD1 and CD2 changes over time.

In block 830, the processor of CD1 may send the rule set to CD2.

In block 832, the processor of CD1 may generate a first result based on the selected elements.

In block 834, a processor of CD2 may receive the rule set from CD1.

In block 836, the processor of CD2 may select elements from its extracted elements using the rule set. For example, the processor of CD2 may use identifiers of each of the selected elements (e.g., one or more of the elements 420-428, or one or more of the elements of the shared data sets 500a-500d) to select the elements from among the extracted elements from the ephemeral shared data set stored at CD2. As another example, the processor of CD2 may use one or more identifiers of one of the elements and one or more relationships among the selected elements to select the elements from among the extracted elements.

In block 838, the processor of CD2 may generate a second result based on the selected elements. In some embodiments, the second result may include a string of data. In some embodiments, the second result may include a value based on the information in the selected elements of the shared data set. In some embodiments, the processor of CD2 may perform a transform of the information of the selected elements, such as generating a hash of values within the information. In some embodiments, the processor of CD2 may generate a data string based on the information of the selected elements and may perform a transform (e.g., generate a hash) of the information of the selected elements to generate the first result. In various embodiments, the processor of CD2 may use the same method of generating the second result that CD1 uses to generate the first result.

In block 840, the processor of CD2 may encrypt a message using the second result. For example, the processor of CD2 may use an encryption method such as MD5, SHA2, SHA256, BLAKE2, and the like, together with the second result to encrypt the message. In some embodiments, the message may serve as a test message to enable the processor of CD1 to determine whether the second result generated by the processor of CD2 matches the first result generated by the processor of CD1.

In block 842, the processor of CD2 may send the encrypted message to CD1.

In block 844, the processor of CD1 may receive the encrypted message.

In block 846, the processor of CD1 may attempt to decrypt the message using the first result. For example, the processor of CD1 may initiate a decryption process of the message. In various embodiments, the processor of CD1 may use decryption format such as MD5, SHA2, SHA256, BLAKE2, and the like to attempt the decryption of the message.

In determination block 848, the processor of CD1 may determine whether the decryption of the message from CD2 was successful. In some embodiments, a successful decryption of the encrypted message from CD2 may indicate that the first result and the second result match.

In response to determining that the decryption was not successful (i.e., determination block 848="No"), in some embodiments the processor of CD1 may determine that CD2 is not authenticated in optional block 850.

In response to determining that the decryption was not successful (i.e., determination block 848="No"), in some embodiments the processor of CD1 may send a synchronization query to the data set manager in optional block 852.

In some embodiments, following the sending of the synchronization query, the processor of the data set manager may again select elements from the ephemeral shared data set in block 812.

In some embodiments, following the sending of the synchronization query, the processors of the data set manager, CD1, and CD2 may perform operations to synchronize the shared data set, in optional block 712, 714, and 716, respectively.

In response to determining that the decryption was successful (i.e., determination block 848="Yes"), the processor of CD1 may encrypt the communication using the first result in block 854. For example, the processor of CD1 may encrypted the communication for which the processor of CD1 sent the indication to the data set manager in block 808.

In block 856, the processor of CD1 may send the encrypted communication to CD2. In some embodiments, the processor of CD1 may then send another indication of to the data set manager that CD1 has a communication to send to CD2.

In block 858, the processor of CD2 may receive the encrypted communication from CD1.

In block 860, the processor of CD2 may decrypt the communication using the second result. In some embodiments, the processor of CD2 may again receive extraction instructions from the data set manager.

In various embodiments, the processor of CD1 may send to the data set manager another indication of a communication intended for CD2 in block 808. In various embodiments, the processor of CD2 may can receive extraction instructions from the data set manager in block 820.

The method 800A is not limited to the sending of a communication from CD1 to CD2, and in various embodiments the processor of CD2 may perform the operations described above with respect to the processor of CD1, and vice versa. In some embodiments, the processors of CD1 and CD2 may perform their respective operations of the method 800A so that CD1 may send an encrypted communication to CD2, and may subsequently switch roles, so that CD2 may send an encrypted communication to CD1.

In various embodiments, the ephemeral shared data set may exist in one state for a relatively short period of time, which may be, for example, minutes, or seconds.

In various embodiments, the dynamic value may be usable to encrypt and decrypt only one communication. This contrasts with the effective duration of certificates from a conventional certifying authority (such as PM certificates), which may have a duration of up to decades in some cases. The relatively short useful duration and the inherent complexity of the ephemeral shared data set and the dynamic value reduces by orders of magnitude the possibility of such information being guessed, accessed, or "hacked" and then used as a means of attacking the system.

Figure 8B:
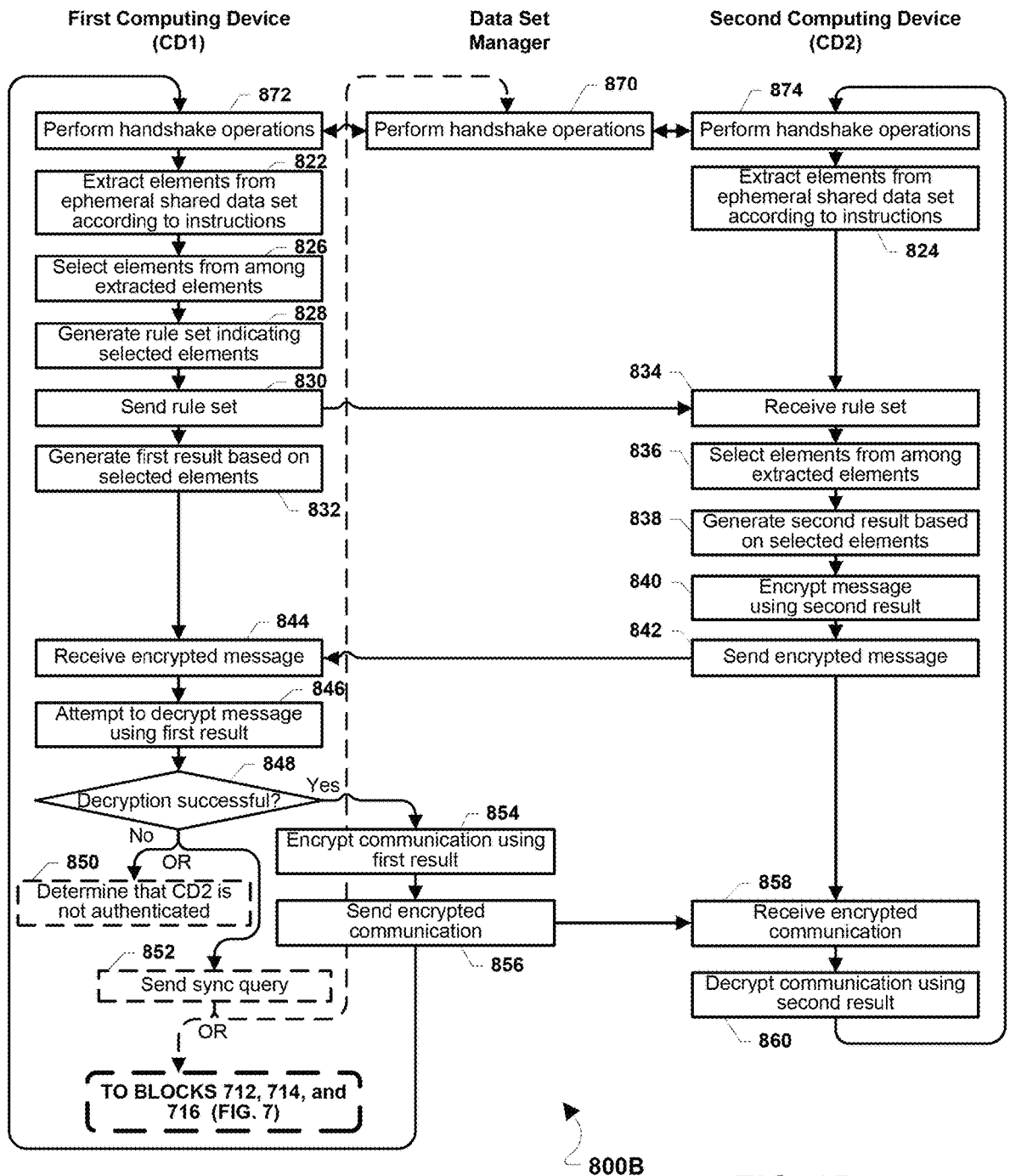
FIG. 8B illustrates a method 800B for protecting a communication according to various embodiments

FIG. 8B illustrates a method 800B for protecting a communication according to various embodiments. With reference to FIGS. 1-8B, the method 800B may be implemented by a processor (e.g., the processor 202 and/or the like) of a computing device (e.g., the computing devices 102 and 106 and the network element 110). In blocks 822-860, the device processors of the data set manager, the first communication device (CD1) and the second communication device (CD2) may perform operations of like-numbered blocks of the method 800A.

In block 870, the processor of the data set manager may perform handshake operations with CD1 and/or CD2. In blocks 872 and 874, the processor of CD1 and the processor of CD2 may perform respective handshake operations with the data set manager. In some embodiments, the handshake operations performed by the processors of the data set manager, CD2, and/or CD2 may include one or more operations for establishing a communication link between the data set manager and CD1 and/or between the data set manager and CD2. In some embodiments, the handshake operations performed by the processors of the data set manager, CD2, and/or CD2 may include one or more operations of providing/obtaining an ephemeral shared data set (e.g., as described with respect to the method 700). In some embodiments, the handshake operations performed by the processors of the data set manager, CD2, and/or CD2 may include one or more synchronization operations to synchronize the ephemeral shared data set (e.g., as described with respect to the method 700). In some embodiments, the handshake operations performed by the processors of the data set manager, CD2, and/or CD2 may include one or more operations to authenticate the data set manager, CD1, and/or CD2. Examples of applicable operations are described U.S. patent application Ser. No. 15/493,572 entitled "Systems and Methods for Device Verification and Authentication" filed Apr. 21, 2017.

In some embodiments, following the sending of the synchronization query (block 852), the processor of the data set manager may again perform handshake operations in block 870.

In some embodiments, following the operations of block 856, the processor of CD1 again perform handshake operations in block 872.

In some embodiments, following the operations of block 860, the processor of CD2 may again perform handshake operations in block 874.

Figure 9A:
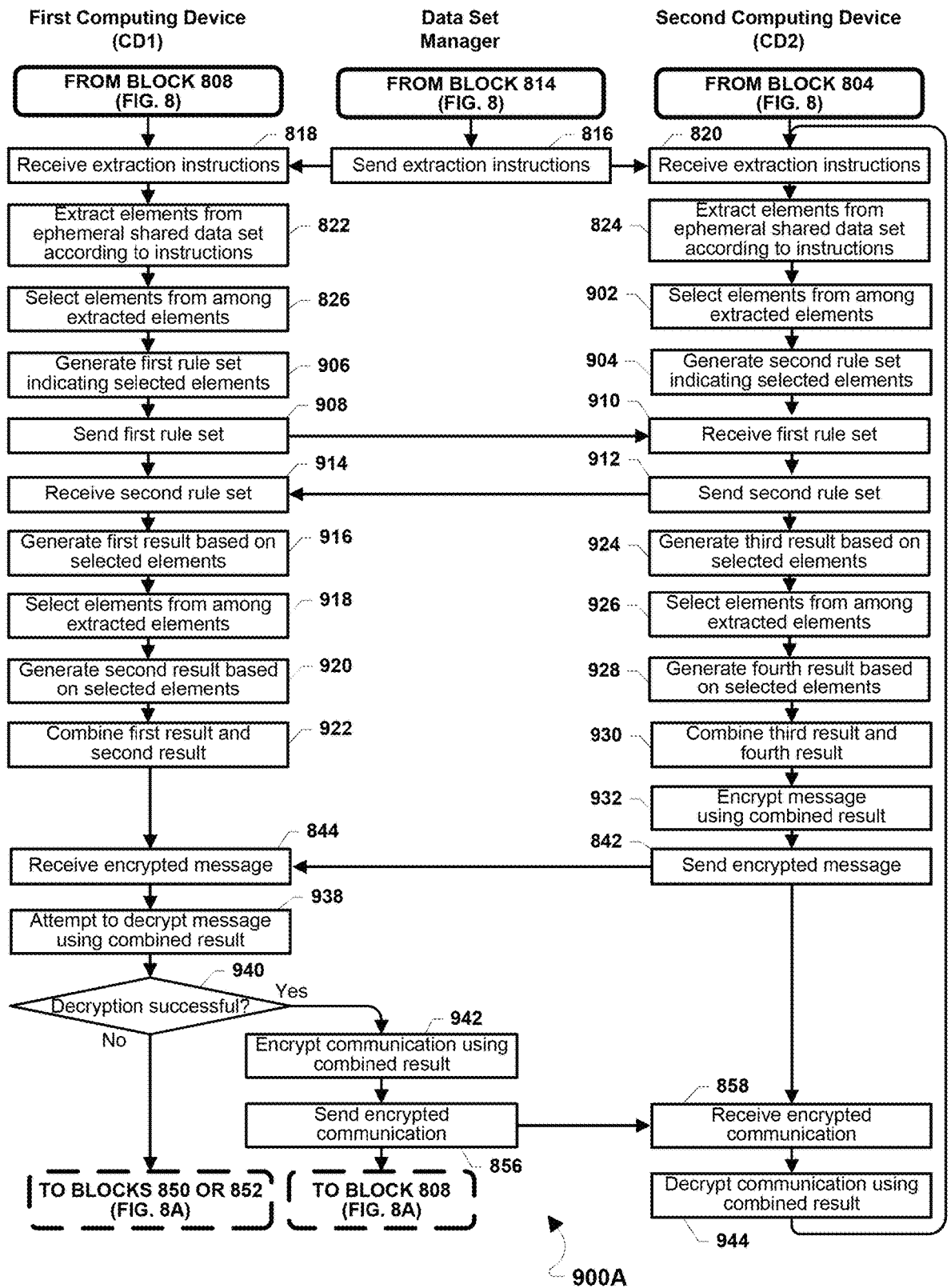
FIG. 9A illustrates a method 900A for protecting a communication according to various embodiments.

FIG. 9A illustrates a method 900A for protecting a communication according to various embodiments. With reference to FIGS. 1-9, the method 900A may be implemented by a processor (e.g., the processor 202 and/or the like) of a computing device (e.g., the computing devices 102 and 106 and the network element 110). In blocks 818-858, the device processors of the data set manager, the first communication device (CD1) and the second communication device (CD2) may perform operations of like-numbered blocks of the method 800A.

In block 902, the processor of CD2 may select one or more elements from among the extracted elements.

In block 904, the processor of CD2 may generate a second rule set indicating the selected elements. For example, the processor of CD2 may select one or more elements from one or more portions of the shared data set, and may generate the second rule set identifying the selected two or more elements. In some embodiments, the processor of CD2 may determine one or more relationships between the selected two or more elements, and may generate the second rule set based on the determined one or more relationships between the selected two or more elements. In some embodiments, the relationship(s) may be based on one or more comparative or relational differences between or among the elements, such as those described above with respect to shared data sets 400 and 500a-500d.

In block 906, the processor of CD1 may generate a first rule set indicating the selected elements. In some embodiments, the first rule set may indicate elements selected by the processor of CD1 in the operations of block 826.

In various embodiments, the first rule set may include instructions for combining a result generated using the first rule set and a result generated using the second rule set. Similarly, in various embodiments, the second rule set may include instructions for combining the result generated using the first rule set and the result generated using the second rule set.

In block 908, the processor of CD1 may send the first rule set to CD2.

In block 910, the processor of CD2 may receive the first rule set.

In block 912, the processor of CD2 may send the second rule set to CD1.

In block 914, the processor of CD1 may receive the second rule set.

In block 916, the processor of CD1 may generate a first result based on the selected elements.

In block 918, the processor of CD1 may select elements from its extracted elements using the second rule set. For example, the processor of CD1 may use identifiers of each of the selected elements (e.g., one or more of the elements 420-428, or one or more of the elements of the shared data sets 500a-500d) to select the elements from among the extracted elements from the shared data set stored at CD1. As another example, the processor of CD1 may use one or more identifiers of one of the elements and one or more relationships among the selected elements to select the elements from among the extracted elements.

In block 920, the processor of CD1 may generate a second result based on the selected elements.

In some embodiments, each of the first result and second result may include a string of data. In some embodiments, the first result and second result may each include a value based on the information in the selected elements of the shared data set. In some embodiments, the processor of CD1 may perform a transform of the information of the selected elements, such as generating a hash of values within the information. In some embodiments, the processor of CD1 may generate a data string based on the information of the selected elements and may perform a transform (e.g., generate a hash) of the information of the selected elements to generate each of the first result and the second result.

In block 922, the processor of CD1 may combine the first result and the second result. In some embodiments, the processor of CD1 may combine the first result and the second result according to instructions in the first rule set. In some embodiments, the processor of CD1 may combine the first result and the second result according to instructions in the second rule set.

In block 924, the processor of CD2 may generate a third result based on the selected elements. In some embodiments, the processor of CD2 may generate the third result based on the elements selected by the processor of CD2 from among the extracted elements (e.g., in the operations of block 902).

In block 926, the processor of CD2 may select elements from its extracted elements using the first rule set received from CD1

In block 928, the processor of CD2 may generate a fourth result based on the selected elements.

In some embodiments, each of the third result and the fourth result may include a string of data. In some embodiments, the third result and the fourth result may each include a value based on the information in the selected elements of the shared data set. In some embodiments, the processor of CD2 may perform a transform of the information of the selected elements, such as generating a hash of values within the information. In some embodiments, the processor of CD2 may generate a data string based on the information of the selected elements and may perform a transform (e.g., generate a hash) of the information of the selected elements to generate each of the third result and the fourth result.

In block 930, the processor of CD2 may combine the third result and the fourth result. In some embodiments, the processor of CD2 may combine the third result and the fourth result according to instructions in the first rule set. In some embodiments, the processor of CD2 may combine the first result and the second result according to instructions in the second rule set.

In block 932, the processor of CD2 may encrypt a message using the combined result. In some embodiments, the message may serve as a test message to enable the processor of CD1 to determine whether the combined result generated by the processor of CD2 matches the combined result generated by the processor of CD1.

In block 842, the processor of CD2 may send the encrypted message to CD1.

In block 844, the processor of CD1 may receive the encrypted message.

In block 938, the processor of CD1 may attempt to decrypt the message using the combined result (i.e., the combined result generated by the processor of CD1 in the operations of block 922).

In determination block 940, the processor of CD1 may determine whether the decryption of the message from CD2 was successful. In some embodiments, a successful decryption of the encrypted message from CD2 may indicate that the combined result determined by CD1 and the combined result determined by CD2 match.

In response to determining that the decryption was not successful (i.e., determination block 940="No"), the processor of CD1 may perform the operations of blocks 850 or 852 (FIG. 8).

In response to determining that the decryption was successful (i.e., determination block 940="Yes"), the processor of CD1 may encrypt the communication using the combined result in block 942. For example, the processor of CD1 may encrypt the communication for which the processor of CD1 sent the indication to the data set manager in block 808 (FIG. 8).

In block 944, the processor of CD2 may decrypt the communication using the combined result. In some embodiments, following the operations of block 944, the processor of CD may receive extraction instructions in block 820.

The method 900A is not limited to the sending of a communication from CD1 to CD2, and in various embodiments the processor of CD2 may perform the operations described above with respect to the processor of CD1, and vice versa. In some embodiments, the processors of CD1 and CD2 may perform their respective operations of the method 900A so that CD1 may send an encrypted communication to CD2, and may subsequently switch roles, so that CD2 may send an encrypted communication to CD1.

Figure 9B:
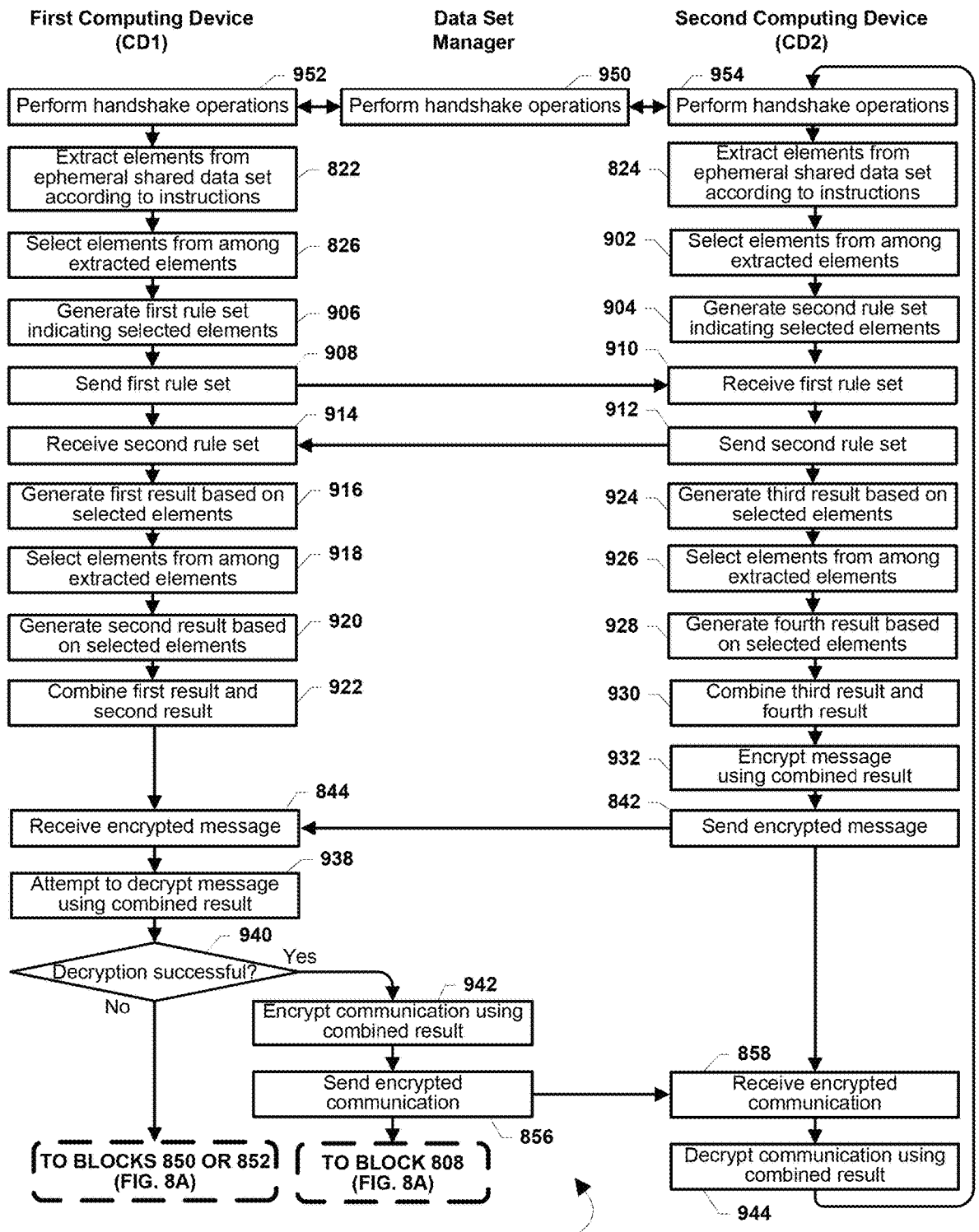
FIG. 9B illustrates a method 900B for protecting a communication according to various embodiments

FIG. 9B illustrates a method 900B for protecting a communication according to various embodiments. With reference to FIGS. 1-9B, the method 900B may be implemented by a processor (e.g., the processor 202 and/or the like) of a computing device (e.g., the computing devices 102 and 106 and the network element 110). In blocks 822-858 and 902-944, the device processors of the data set manager, the first communication device (CD1) and the second communication device (CD2) may perform operations of like-numbered blocks of the methods 800A and 900A.

In block 950, the processor of the data set manager may perform handshake operations with the first computing device (CD1) and/or the second computing device (CD2). In blocks 952 and 954, the processor of CD1 and the processor of CD2 may perform respective handshake operations with the data set manager. In some embodiments, the handshake operations performed by the processors of the data set manager, CD2, and/or CD2 may include one or more operations for establishing a communication link between the data set manager and CD1 and/or between the data set manager and CD2. In some embodiments, the handshake operations performed by the processors of the data set manager, CD2, and/or CD2 may include one or more operations of providing/obtaining an ephemeral shared data set (e.g., as described with respect to the method 700). In some embodiments, the handshake operations performed by the processors of the data set manager, CD2, and/or CD2 may include one or more synchronization operations to synchronize the ephemeral shared data set (e.g., as described with respect to the method 700). In some embodiments, the handshake operations performed by the processors of the data set manager, CD2, and/or CD2 may include one or more operations to authenticate the data set manager, CD1, and/or CD2. In some embodiments, the handshake operations performed by the processors of the data set manager, CD2, and/or CD2 may include one or more operations of blocks 802-820 (e.g., as described with respect to the method 800A).

In some embodiments, following the sending of the synchronization query (block 852), the processor of the data set manager may again perform handshake operations in block 870.

Figure 10A:
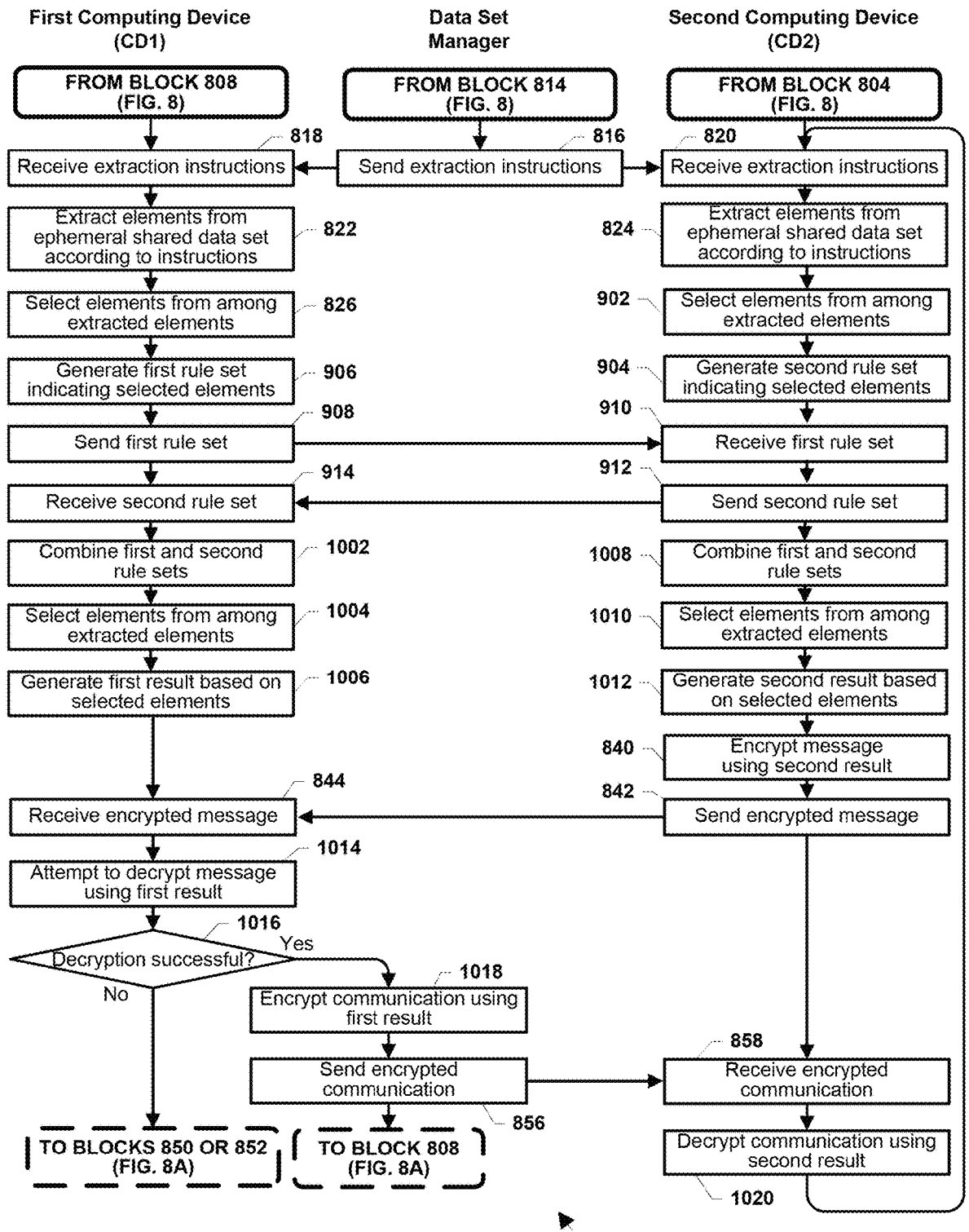
FIG. 10A illustrates a method 1000A for protecting a communication according to various embodiments.

FIG. 10A illustrates a method 1000A for protecting a communication according to various embodiments. With reference to FIGS. 1-10A, the method 1000A may be implemented by a processor (e.g., the processor 202 and/or the like) of a computing device (e.g., the computing devices 102 and 106 and the network element 110). In blocks 818-858 and 902-914, the device processors of the data set manager, the first communication device (CD1) and the second communication device (CD2) may perform operations of like-numbered blocks of the methods 800A and 900A.

In block 1002, the processor of CD1 may combine the first and second rule sets to generate a combined rule set. In some embodiments, the first rule set may include instructions for combining the first and second rule set. In some embodiments, the second rule set may include instructions for combining the first and second rule set.

In block 1004, the processor of CD1 may select elements from its extracted elements using the combined rule set. For example, the processor of CD1 may use identifiers of each of the selected elements (e.g., one or more of the elements 420-428, or one or more of the elements of the shared data sets 500a-500d) to select the elements from among the extracted elements from the shared data set stored at CD1. As another example, the processor of CD1 may use one or more identifiers of one of the elements and one or more relationships among the selected elements to select the elements from among the extracted elements.

In block 1006, the processor of CD1 may generate a first result based on the selected elements.

In block 1008, the processor of CD2 may combine the first and second rule sets to generate a combined rule set. In some embodiments, the first rule set may include instructions for combining the first and second rule set. In some embodiments, the second rule set may include instructions for combining the first and second rule set.

In block 1010, the processor of CD2 may select elements from its extracted elements using the combined rule set. For example, the processor of CD2 may use identifiers of each of the selected elements (e.g., one or more of the elements 420-428, or one or more of the elements of the shared data sets 500a-500d) to select the elements from among the extracted elements from the shared data set stored at CD2. As another example, the processor of CD2 may use one or more identifiers of one of the elements and one or more relationships among the selected elements to select the elements from among the extracted elements.

In block 1012, the processor of CD2 may generate a second result based on the selected elements.

In block 1014, the processor of CD1 may attempt to decrypt the message (from CD2) using the first result.

In determination block 1016, the processor of CD1 may determine whether the decryption of the message from CD2 was successful. In some embodiments, a successful decryption of the encrypted message from CD2 may indicate that the first result and the second result match.

In response to determining that the decryption was successful (i.e., determination block 1016="Yes"), the processor of CD1 may encrypt the communication using the first result in block 1018. For example, the processor of CD1 may encrypt the communication for which the processor of CD1 sent the indication to the data set manager in block 808 (FIG. 8).

In block 1020, the processor of CD2 may decrypt the communication using the second result.

The method 1000A is not limited to the sending of a communication from CD1 to CD2, and in various embodiments the processor of CD2 may perform the operations described above with respect to the processor of CD1, and vice versa. In some embodiments, the processors of CD1 and CD2 may perform their respective operations of the method 1000A so that CD1 may send an encrypted communication to CD2, and may subsequently switch roles, so that CD2 may send an encrypted communication to CD1.

Figure 10B:
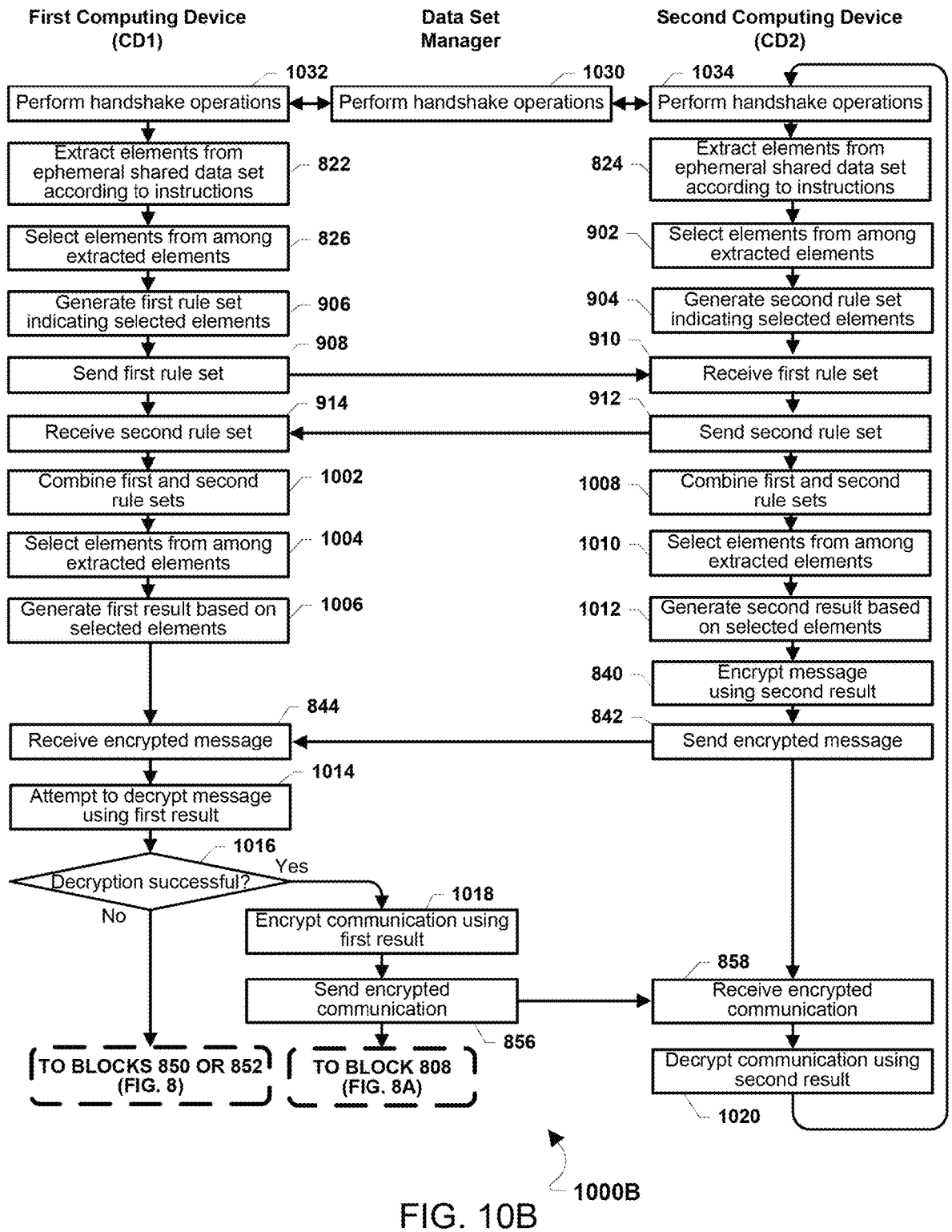
FIG. 10B illustrates a method 1000B for protecting a communication according to various embodiments.

FIG. 10B illustrates a method 1000B for protecting a communication according to various embodiments. With reference to FIGS. 1-10B, the method 1000B may be implemented by a processor (e.g., the processor 202 and/or the like) of a computing device (e.g., the computing devices 102 and 106 and the network element 110). In blocks 822-858, 902-914, and 1002-1020, the device processors of the data set manager, the first communication device (CD1) and the second communication device (CD2) may perform operations of like-numbered blocks of the methods 800A, 900A, and 1000A.

In block 1030, the processor of the data set manager may perform handshake operations with the first computing device (CD1) and/or the second computing device (CD2). In blocks 1032 and 1034, the processor of CD1 and the processor of CD2 may perform respective handshake operations with the data set manager. In some embodiments, the handshake operations performed by the processors of the data set manager, CD2, and/or CD2 may include one or more operations for establishing a communication link between the data set manager and CD1 and/or between the data set manager and CD2. In some embodiments, the handshake operations performed by the processors of the data set manager, CD2, and/or CD2 may include one or more operations of providing/obtaining an ephemeral shared data set (e.g., as described with respect to the method 700). In some embodiments, the handshake operations performed by the processors of the data set manager, CD2, and/or CD2 may include one or more synchronization operations to synchronize the ephemeral shared data set (e.g., as described with respect to the method 700). In some embodiments, the handshake operations performed by the processors of the data set manager, CD2, and/or CD2 may include one or more operations to authenticate the data set manager, CD1, and/or CD2. In some embodiments, the handshake operations performed by the processors of the data set manager, CD2, and/or CD2 may include one or more operations of blocks 802-820 (e.g., as described with respect to the method 800A).

In some embodiments, following the decryption of the communication using the second result in block 1020, the processor of CD2 may again perform handshake operations in block 1034.

Figure 11A:
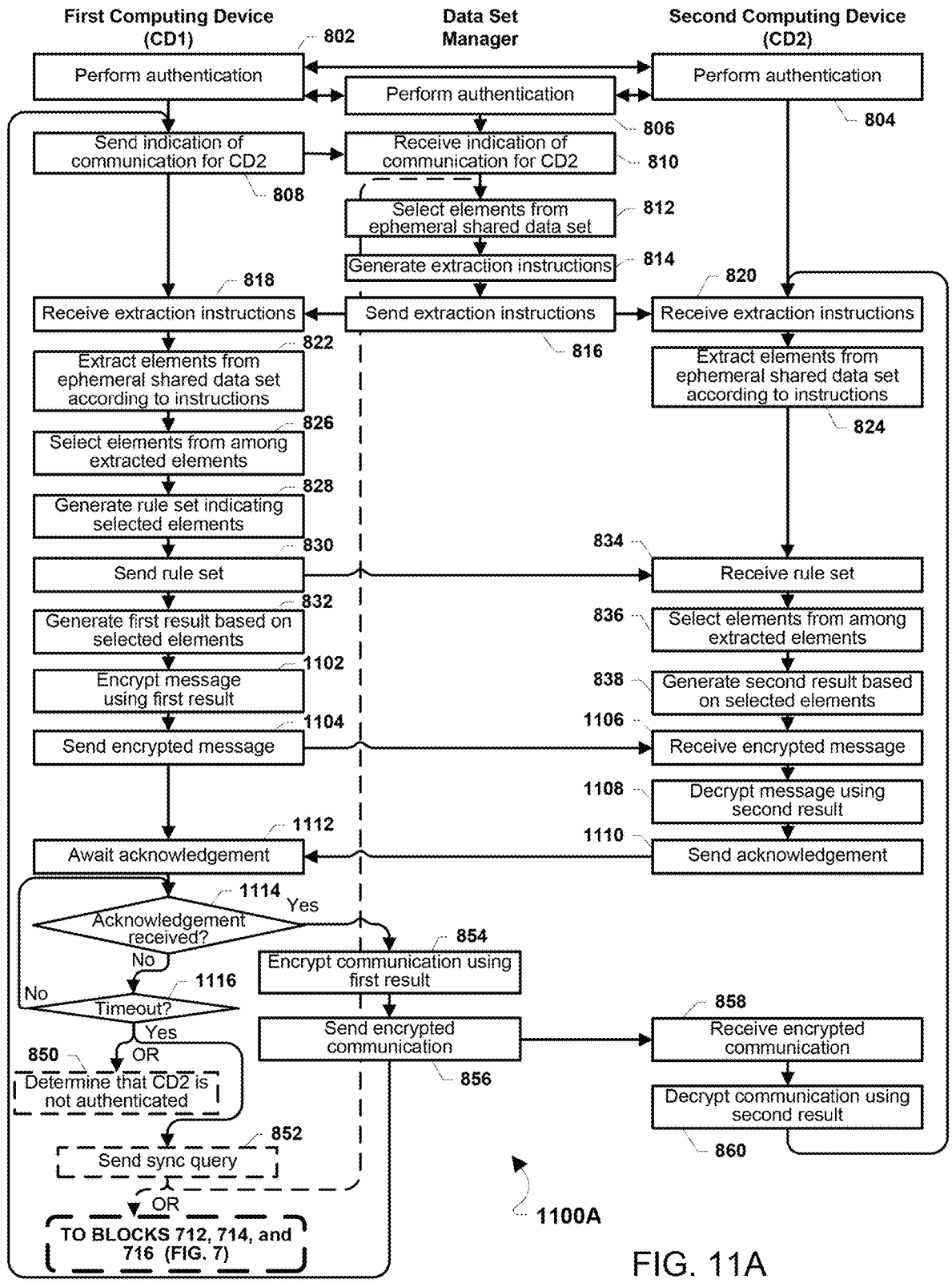
FIG. 11A illustrates a method 1100A for protecting a communication according to various embodiments.

FIG. 11A illustrates a method 1100A for protecting a communication according to various embodiments. With reference to FIGS. 1-11A, the method 1100A may be implemented by a processor (e.g., the processor 202 and/or the like) of a computing device (e.g., the computing devices 102 and 106 and the network element 110). In blocks 818-858, the device processors of the data set manager, the first communication device (CD1) and the second communication device (CD2) may perform operations of like-numbered blocks of the method 800A. In various embodiments, the method 1100A may be useful in implementations including one or more computing devices having limited processing and/or memory resources. One example of such computing devices includes IoT devices or other similar devices.

In various embodiments, the method 1100A may be useful in implementations including one or more computing devices having limited processing and/or memory resources. One example of such computing devices includes IoT devices or other similar devices.

In block 1102, the processor of CD1 may encrypt a message using the first result. For example, the processor of CD1 may use an encryption method such as MD5, SHA2, SHA256, BLAKE2, and the like, together with the first result to encrypt the message.

In block 1104, the processor of CD1 may send the encrypted message to the second computing device.

In block 1106, the processor of CD2 may receive the encrypted message.

In block 1108, the processor of CD2 may decrypt the message using the second result. For example, the processor of CD1 may initiate a decryption process of the message. In some embodiments, the processor of CD2 may attempt to decrypt the message using the second result. In various embodiments, the processor of CD1 may use decryption format such as MD5, SHA2, SHA256, BLAKE2, and the like to attempt the decryption of the message.

In block 1110, the processor CD2 may send an acknowledgment message to CD1. In some embodiments, the acknowledgment message may serve to indicate to CD 1 back to the processor of CD 2 has successfully decrypted the encrypted message using the second result.

In block 1112, the processor of CD1 may await the knowledge and message from CD2. For example, the processor CD1, having send the encrypted message in block 1104, may expect to receive the acknowledgment message from CD2.

In determination block 1114, the processor of CD1 may determine whether the knowledge of messages received from CD2.

In response to determining that the acknowledgment message has been received (i.e., determination block 1114="Yes"), the processor of CD1 may perform the operations of block 854 (FIG. 8).

In response to determining that the acknowledgment message has not been received (i.e., determination block 1114="No"), the processor of CD1 may determine whether a timeout period has elapsed in determination block 1116. In some embodiments, the processor of CD1 may wait for the acknowledgment message from CD2 for a period of time (e.g., a timeout period).

In response to determining that the timeout period has not elapsed (i.e., determination block 1116="No"), the processor of CD1 may again determine whether the acknowledgment message has been received in determination block 1114.

In response to determining that the timeout period has elapsed (i.e., determination block 1116="Yes"), the processor of CD1 may perform the operations of block 850 or block 852 (FIG. 8).

Figure 11B:
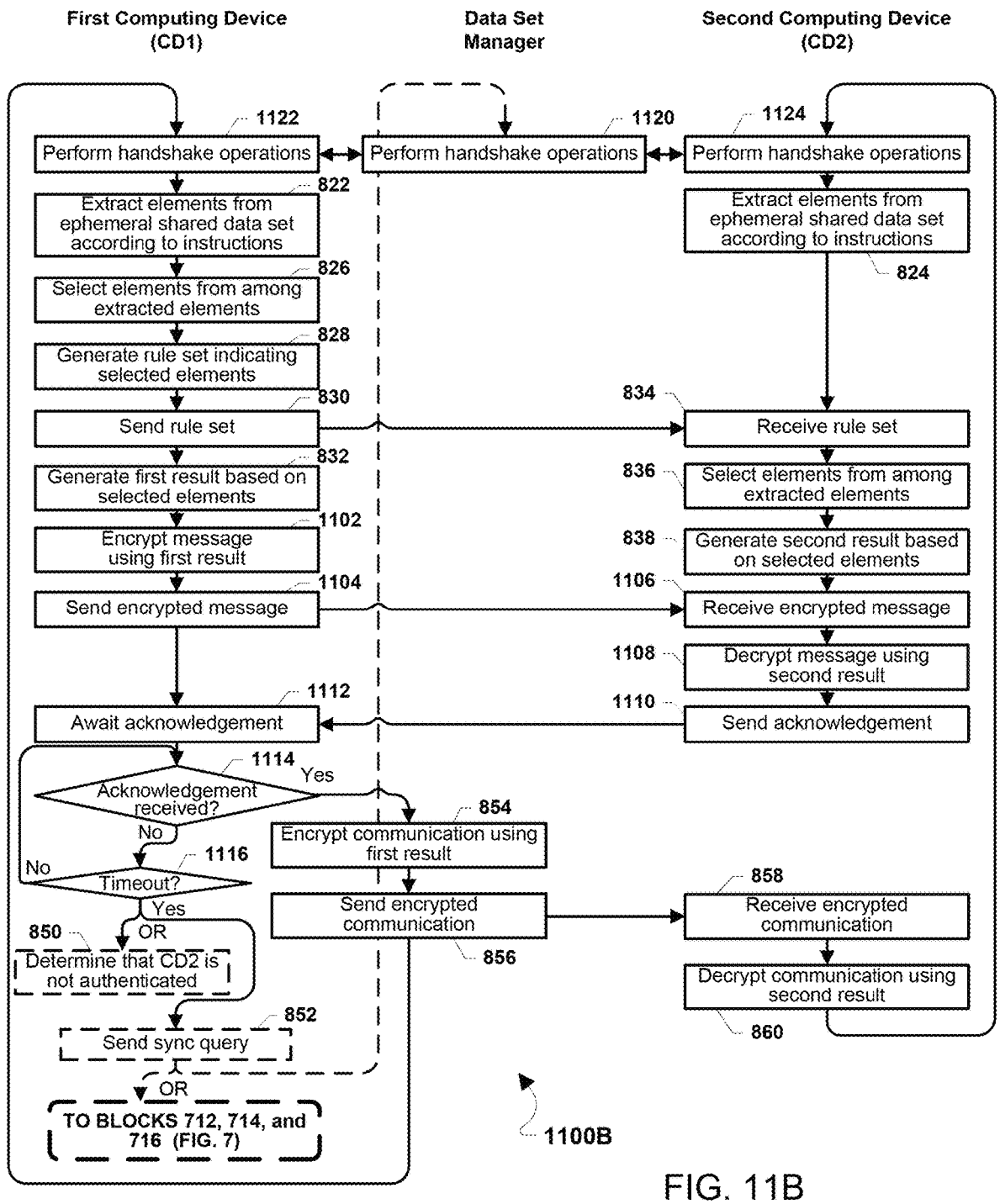
FIG. 11B illustrates a method 1100B for protecting a communication according to various embodiments.

FIG. 11B illustrates a method 1100B for protecting a communication according to various embodiments. With reference to FIGS. 1-11B, the method 1100B may be implemented by a processor (e.g., the processor 202 and/or the like) of a computing device (e.g., the computing devices 102 and 106 and the network element 110). In blocks 822-860 and 1102-1116, the device processors of the data set manager, the first communication device (CD1) and the second communication device (CD2) may perform operations of like-numbered blocks of the methods 800A and 1100A.

In block 1120, the processor of the data set manager may perform handshake operations with the first computing device (CD1) and/or the second computing device (CD2). In blocks 1122 and 1124, the processor of CD1 and the processor of CD2 may perform respective handshake operations with the data set manager. In some embodiments, the handshake operations performed by the processors of the data set manager, CD2, and/or CD2 may include one or more operations for establishing a communication link between the data set manager and CD1 and/or between the data set manager and CD2. In some embodiments, the handshake operations performed by the processors of the data set manager, CD2, and/or CD2 may include one or more operations of providing/obtaining an ephemeral shared data set (e.g., as described with respect to the method 700). In some embodiments, the handshake operations performed by the processors of the data set manager, CD2, and/or CD2 may include one or more synchronization operations to synchronize the ephemeral shared data set (e.g., as described with respect to the method 700). In some embodiments, the handshake operations performed by the processors of the data set manager, CD2, and/or CD2 may include one or more operations to authenticate the data set manager, CD1, and/or CD2. In some embodiments, the handshake operations performed by the processors of the data set manager, CD2, and/or CD2 may include one or more operations of blocks 802-820 (e.g., as described with respect to the method 800A).

In some embodiments, following the sending of the synchronization query (block 852), the processor of the data set manager may again perform handshake operations in block 870.

In some embodiments, following the operations of block 856, the processor of CD1 may perform handshake operations in block 1122.

In some embodiments, following the operations of block 860, the processor of CD2 may perform handshake operations in block 1124.

Figure 12A:
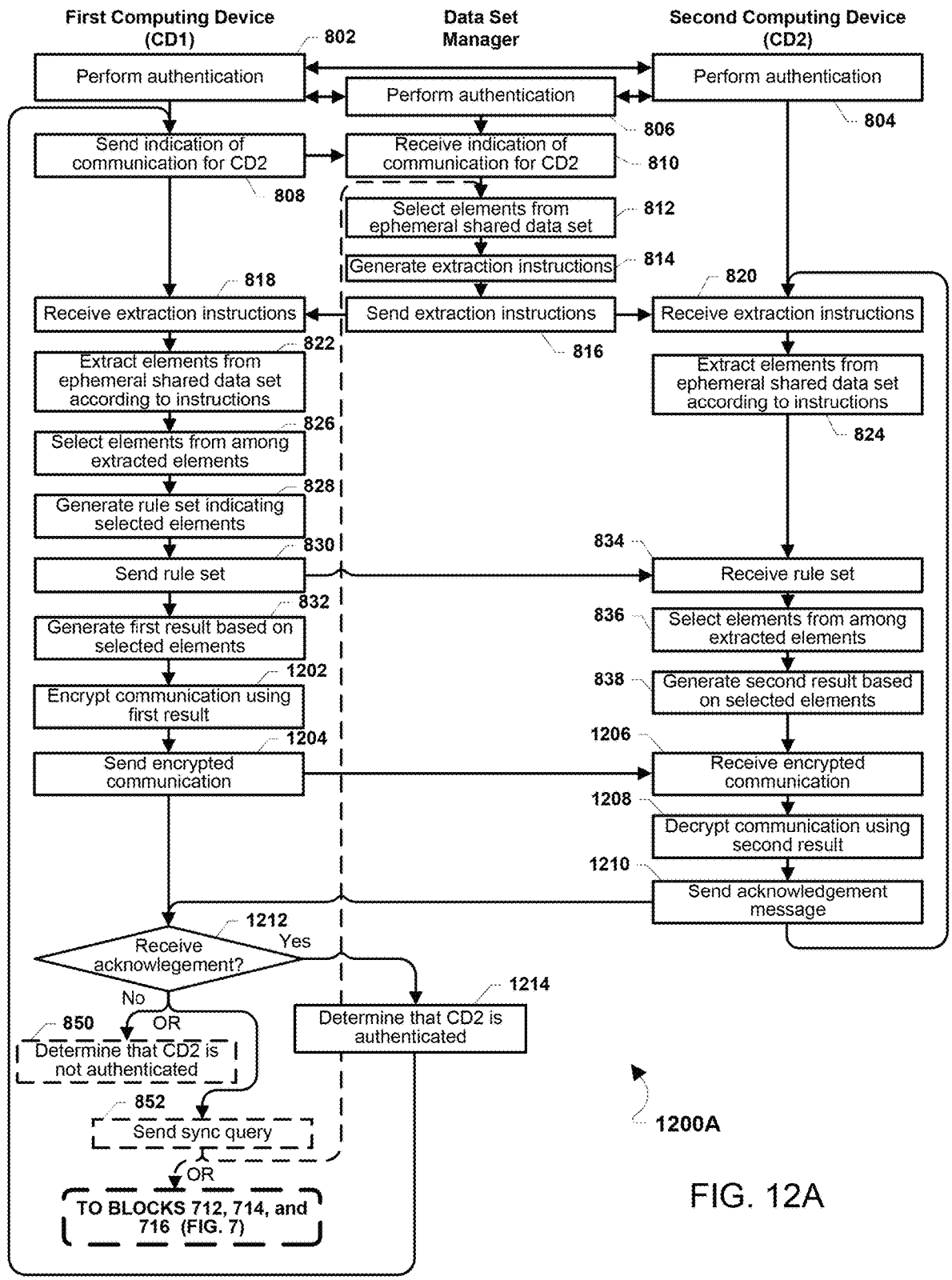
FIG. 12A illustrates a method 1200B for protecting a communication according to various embodiments.

FIG. 12A illustrates a method 1200A for protecting a communication according to various embodiments. With reference to FIGS. 1-12A, the method 1200A may be implemented by a processor (e.g., the processor 202 and/or the like) of a computing device (e.g., the computing devices 102 and 106 and the network element 110). In blocks 818-838, the device processors of the data set manager, the first communication device (CD1) and the second communication device (CD2) may perform operations of like-numbered blocks of the method 800A.

In some embodiments, the operations of the method 1200A may be employed in an IoT system. For example, CD1 and CD2 may each be, include, or be a component of an IoT device. In some embodiments, CD1 may function as an IoT hub, controller, router, or another similar IoT device. In some embodiments, CD2 may function as an IoT device having less processing capability and/or memory capability than CD1, such as, for example, a smart light bulb or light switch, a smart door lock or doorknob, or another similar IoT device. In some embodiments, the operations of CD2 described in the method 1200A are relatively simplified (e.g., as compared to operations described above with respect to the methods 800A and 800B) to facilitate the performance by an IoT device or another similar device with relatively limited processing power and/or memory.

In block 1202, the processor of CD1 may encrypt a message using the first result. For example, the processor of CD1 may use an encryption method such as MD5, SHA2, SHA256, BLAKE2, and the like, together with the second result to encrypt the message. In some embodiments, the message may serve as a test message to enable the processor of CD1 to determine whether the second result generated by the processor of CD2 matches the first result generated by the processor of CD1. In some embodiments, the processor of CD1 may generate a relatively short message, for example, in the case where CD2 is a computing device with relatively limited processing power and/or memory.

In block 1204, the processor of CD1 may send the encrypted message to CD2.

In block 1206, the processor of CD2 may receive the encrypted message.

In block 1208, the processor of CD2 may attempt to decrypt the message using the first result. For example, the processor of CD2 may initiate a decryption process of the message. In various embodiments, the processor of CD2 may use decryption format such as MD5, SHA2, SHA256, BLAKE2, and the like to attempt the decryption of the message.

In block 1210, the processor of CD2 may send an acknowledgement message to CD1.

In determination block 1212, the processor of CD1 may determine whether an acknowledgement message is received (e.g., the acknowledgement message sent by CD2 in block 1210).

In response to determining that the acknowledgment message is received (i.e., determination block 1212="Yes"), the processor of CD1 may determine that CD2 is authenticated in block 1214. The processor of CD1 may then perform the operations of block 808.

In response to determining that the acknowledgment message is not received (i.e., determination block 1212="No"), the processor of CD1 may perform the operations of optional blocks 850 or 852.

Figure 12B:
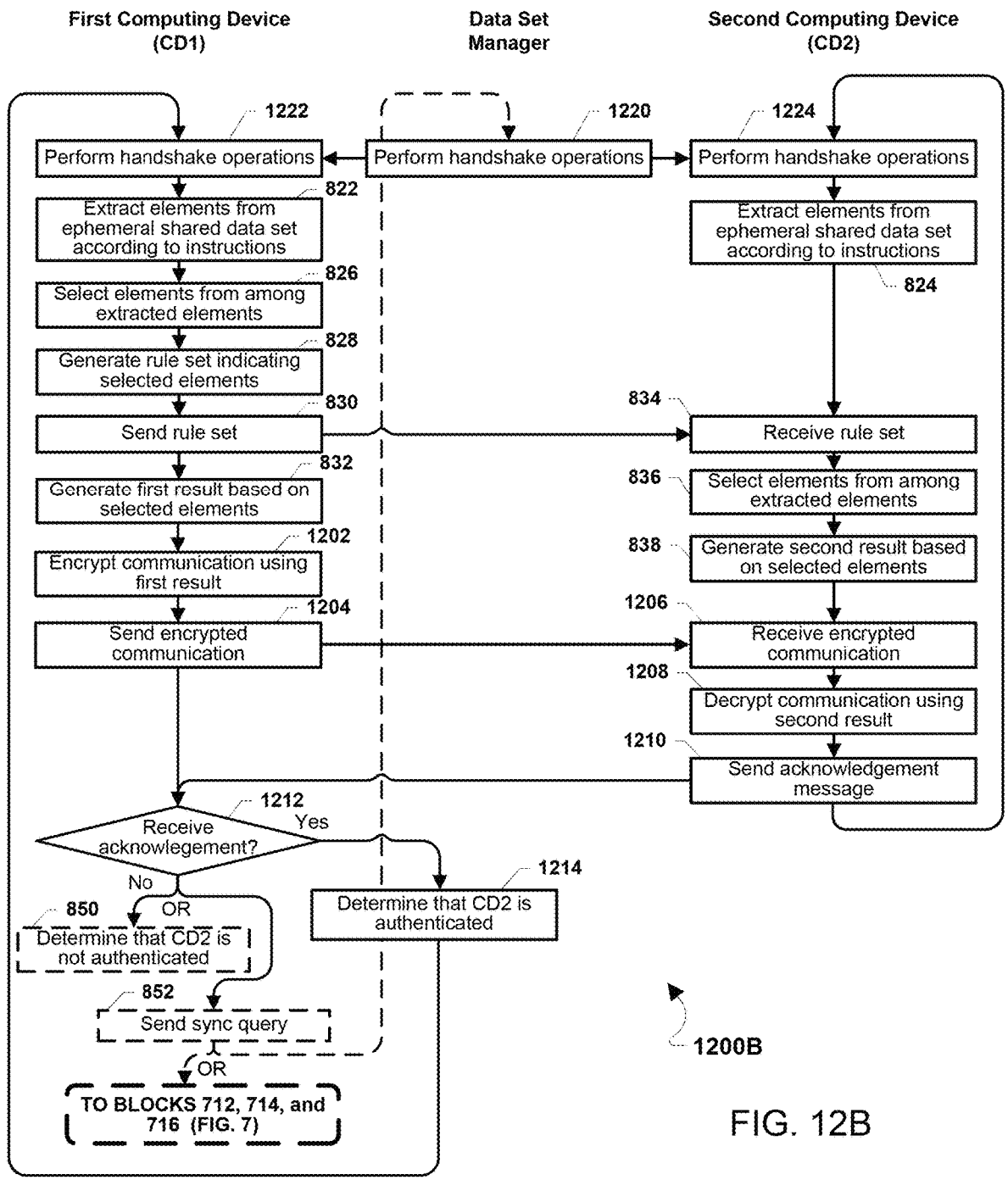
FIG. 12B illustrates a method 1200B for protecting a communication according to various embodiments.

FIG. 12B illustrates a method 1200B for protecting a communication according to various embodiments. With reference to FIGS. 1-12B, the method 1200B may be implemented by a processor (e.g., the processor 202 and/or the like) of a computing device (e.g., the computing devices 102 and 106 and the network element 110). In blocks 822-852 and 1202-1214, the device processors of the data set manager, the first communication device (CD1) and the second communication device (CD2) may perform operations of like-numbered blocks of the methods 800A and 1200A.

In block 1220, the processor of the data set manager may perform handshake operations with the first computing device (CD1) and/or the second computing device (CD2). In blocks 1222 and 1224, the processor of CD1 and the processor of CD2 may perform respective handshake operations with the data set manager. In some embodiments, the handshake operations performed by the processors of the data set manager, CD2, and/or CD2 may include one or more operations for establishing a communication link between the data set manager and CD1 and/or between the data set manager and CD2. In some embodiments, the handshake operations performed by the processors of the data set manager, CD2, and/or CD2 may include one or more operations of providing/obtaining an ephemeral shared data set (e.g., as described with respect to the method 700). In some embodiments, the handshake operations performed by the processors of the data set manager, CD2, and/or CD2 may include one or more synchronization operations to synchronize the ephemeral shared data set (e.g., as described with respect to the method 700). In some embodiments, the handshake operations performed by the processors of the data set manager, CD2, and/or CD2 may include one or more operations to authenticate the data set manager, CD1, and/or CD2. In some embodiments, the handshake operations performed by the processors of the data set manager, CD2, and/or CD2 may include one or more operations of blocks 802-820 (e.g., as described with respect to the method 800A).

In some embodiments, following the sending of the synchronization query (block 852), the processor of the data set manager may again perform handshake operations in block 870.

In some embodiments, following the operations of block 856, the processor of CD1 may perform handshake operations in block 1122.

In some embodiments, following the operations of block 860, the processor of CD2 may perform handshake operations in block 1124.

Figure 13:
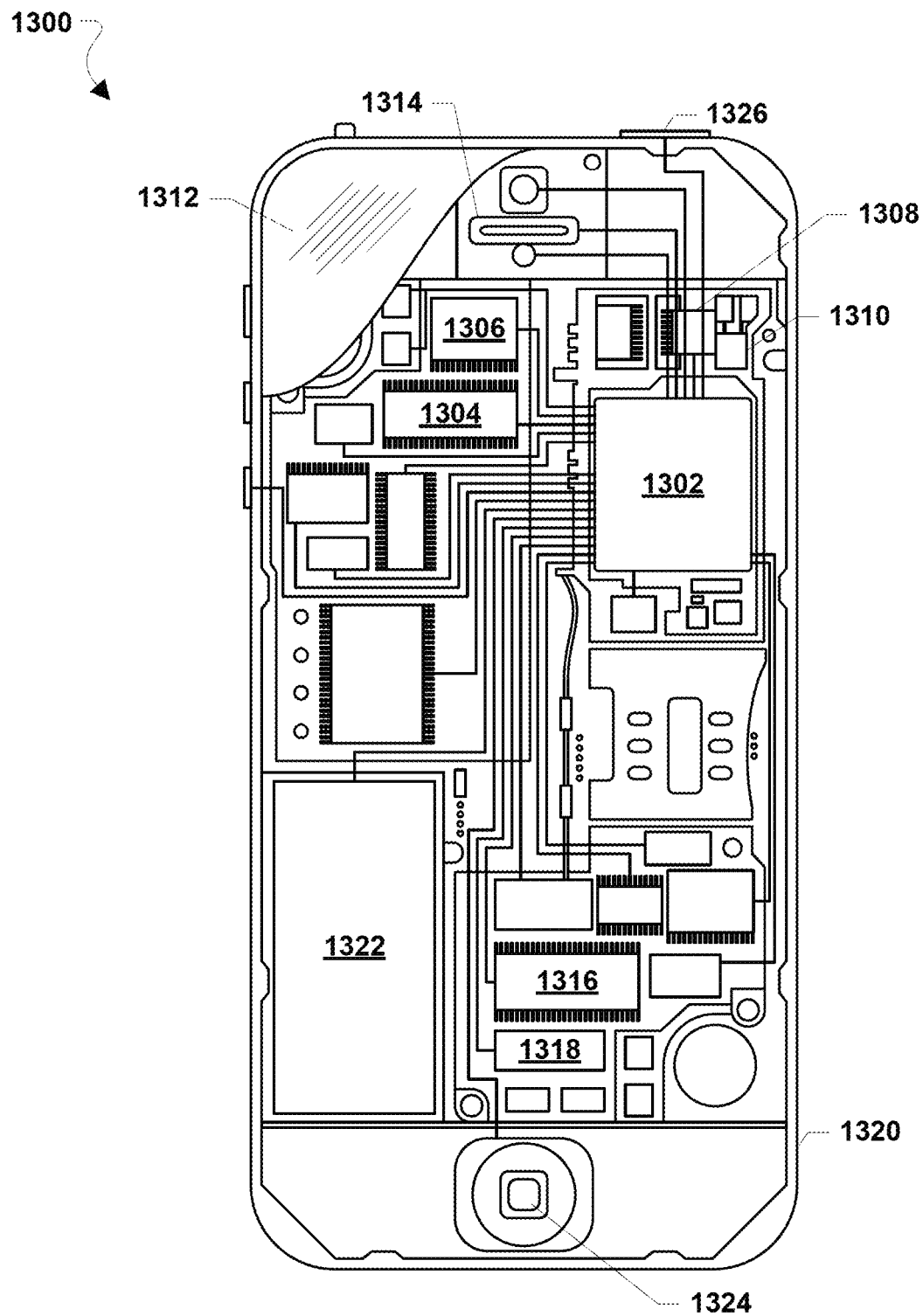
FIG. 13 is a component block diagram of a mobile wireless computing device suitable for implementing various embodiments.

FIG. 13 is a component block diagram of a mobile wireless communication device 1300 suitable for implementing various embodiments. With reference to FIGS. 1-13, the mobile wireless communication device 1300 may include a processor 1302 coupled to a touchscreen controller 1306 and an internal memory 1304. The processor 1302 may be one or more multi-core integrated circuits designated for general or specific processing tasks. The internal memory 1304 may be volatile or non-volatile memory, and may also be secure and/or encrypted memory, or unsecure and/or unencrypted memory, or any combination thereof. The touchscreen controller 1306 and the processor 1302 may also be coupled to a touchscreen panel 1312, such as a resistive-sensing touchscreen, capacitive-sensing touchscreen, infrared sensing touchscreen, etc. Additionally, the display of the mobile wireless communication device 1300 need not have touch screen capability.

The mobile wireless communication device 1300 may have two or more radio signal transceivers 1308 (e.g., Bluetooth, Zigbee, Wi-Fi, radio frequency (RF), etc.) and antennae 1310, for sending and receiving communications, coupled to each other and/or to the processor 1302. The transceivers 1308 and antennae 1310 may be used with the above-mentioned circuitry to implement the various wireless transmission protocol stacks and interfaces. The mobile wireless communication device 1300 may include one or more cellular network wireless modem chip(s) 1316 coupled to the processor and antennae 1310 that enables communication via two or more cellular networks via two or more radio access technologies.

The mobile wireless communication device 1300 may include a peripheral wireless device connection interface 1318 coupled to the processor 1302. The peripheral wireless device connection interface 1318 may be singularly configured to accept one type of connection, or may be configured to accept various types of physical and communication connections, common or proprietary, such as USB, FireWire, Thunderbolt, or PCIe. The peripheral wireless device connection interface 1318 may also be coupled to a similarly configured peripheral wireless device connection port (not shown).

The mobile wireless communication device 1300 may also include speakers 1310 for providing audio outputs. The mobile wireless communication device 1300 may also include a housing 1320, constructed of a plastic, metal, or a combination of materials, for containing all or some of the components discussed herein. The mobile wireless communication device 1300 may include a power source 1322 coupled to the processor 1302, such as a disposable or rechargeable battery. The rechargeable battery may also be coupled to the peripheral wireless device connection port to receive a charging current from a source external to the mobile wireless communication device 1300. The mobile wireless communication device 1300 may also include a physical button 1324 for receiving user inputs. The mobile wireless communication device 1300 may also include a power button 1326 for turning the mobile wireless communication device 1300 on and off.

Figure 14:
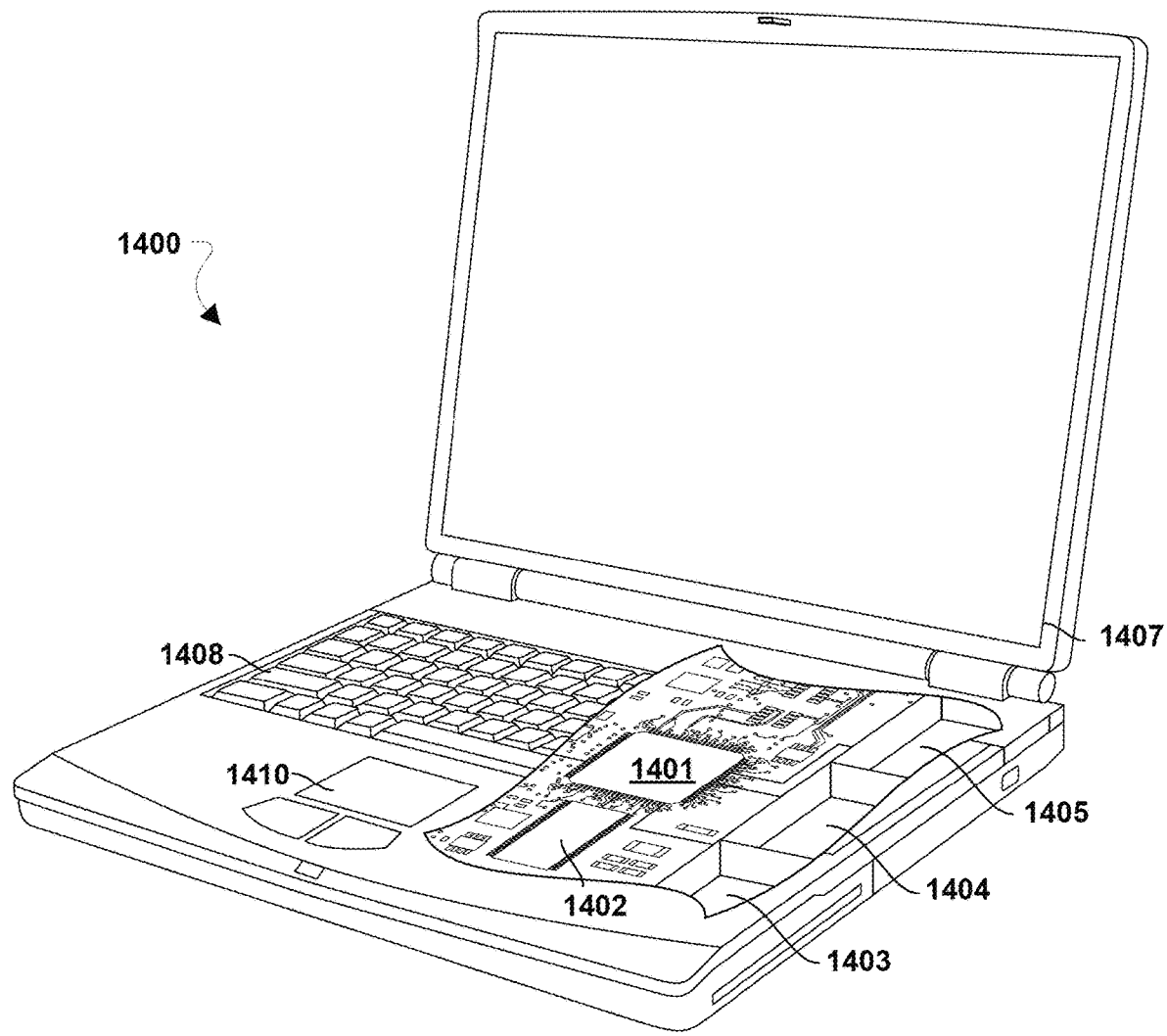
FIG. 14 is a component block diagram of a portable wireless communication device suitable for implementing various embodiments.

Other forms of computing devices may also benefit from the various aspects. Such computing devices typically include the components illustrated in FIG. 14, which illustrates an example laptop computer 1400. With reference to FIGS. 1-14, the computer 1400 generally includes a processor 1401 coupled to volatile memory 1402 and a large capacity nonvolatile memory, such as a disk drive 1403. The computer 1400 may also include a compact disc (CD) and/or DVD drive 1404 coupled to the processor 1401. The computer 1400 may also include a number of connector ports coupled to the processor 1401 for establishing data connections or receiving external memory devices, such as a network connection circuit 1405 for coupling the processor 1401 to a network. The computer 1400 may also include a display 1407, a keyboard 1408, a pointing device such as a trackpad 1410, and other similar devices.

Figure 15:
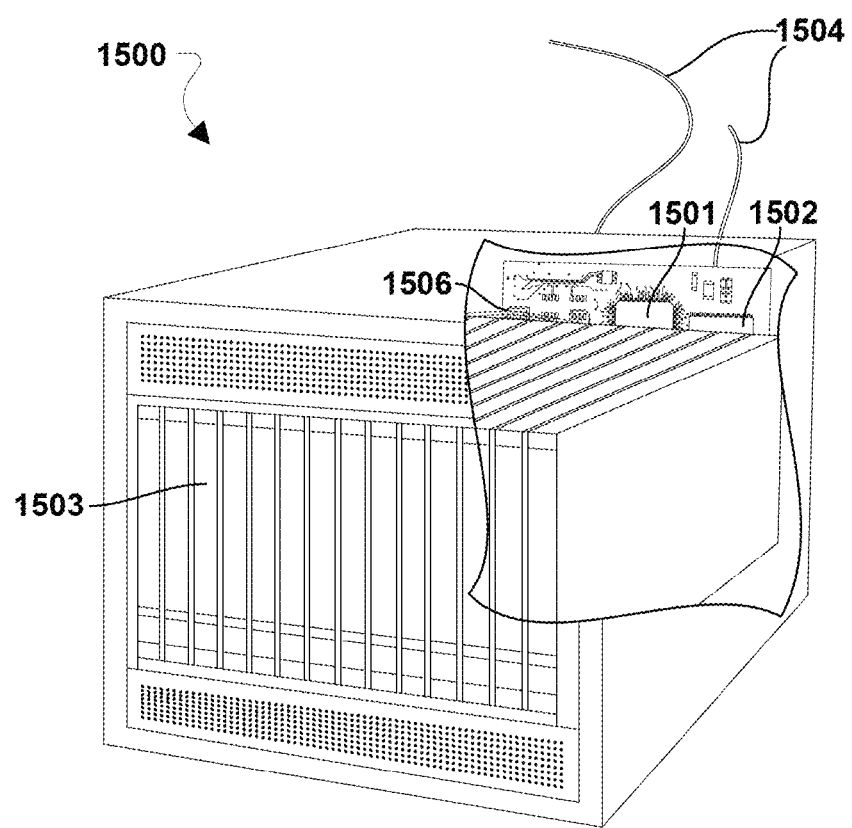
FIG. 15 is a component block diagram of a server device suitable for implementing various embodiments.

Various embodiments may employ a computing device as a network element of a communication network. Such network elements may typically include at least the components illustrated in FIG. 15, which illustrates an example network element, server device 1500. With reference to FIGS. 1-15, the server device 1500 may typically include a processor 1501 coupled to volatile memory 1502 and a large capacity nonvolatile memory, such as a disk drive 1503. The server device 1500 may also include a peripheral memory access device such as a floppy disc drive, compact disc (CD) or digital video disc (DVD) drive 1506 coupled to the processor 1501. The server device 1500 may also include network access ports 1504 (or interfaces) coupled to the processor 1501 for establishing data connections with a network, such as the Internet and/or a local area network coupled to other system computers and servers. Similarly, the server device 1500 may include additional access ports, such as USB, Firewire, Thunderbolt, and the like for coupling to peripherals, external memory, or other devices.

The processors 1302, 1401, 1501 may be any programmable microprocessor, microcomputer or multiple processor chip or chips that can be configured by software instructions (applications) to perform a variety of functions, including the functions of the various aspects described below. In some mobile devices, multiple processors 1302 may be provided, such as one processor dedicated to wireless communication functions and one processor dedicated to running other applications. Typically, software applications may be stored in the internal memory 1304, 1402, 1502 before they are accessed and loaded into the processor 1302, 1401, 1501. The processor 1302, 1401, 1501 may include internal memory sufficient to store the application software instructions.

Various embodiments enhance and improve the security function of any communication network or any electronic communication system by improving the security of communications by utilizing a dynamically changing shared information context. Various embodiments also enhance and improve the security of communications on a communication network by utilizing a dynamically generated result based on the dynamically changing shared information context. The information context may include, for example, a dynamically changing shared data set. Various embodiments also improve the security function of any communication network by using a dynamic shared data set and a dynamically generated value based on the dynamic shared data set, without relying on easily compromised static identification information (such as a shared secret) that may be vulnerable to unauthorized access and copying. Various embodiments employ the dynamically-changing shared data and the dynamically generated value to protect communications in a manner that does not rely on the paradigm of shared secrets and static information.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 700, 800A, 800B, 900A, 900B, 1000A, 1000B, 1100A, 1100B, 1200A, and 1200B may be substituted for or combined with one or more operations of the methods 300, 700, 800A, 800B, 900A, 900B, 1000A, 1000B, 1100A, 1100B, 1200A, and 1200B.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art, the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of protecting a communication between a first computing device and a second computing device, comprising:
   selecting by the first computing device elements from an ephemeral shared data set stored at the first computing device and the second computing device;
   generating by the first computing device a rule set indicating locations of the selected elements in the ephemeral shared data set;
   sending by the first computing device the generated rule set to the second computing device;
   generating by the first computing device a result based on the selected elements;
   encrypting by the first computing device a message using the generated result; and
   sending the encrypted message to the second computing device.

2. The method of claim 1, wherein selecting elements from the ephemeral shared data set stored at the first computing device and the second computing device comprises:
   receiving instructions from a data set management device to extract elements from the ephemeral shared data set stored at the first computing device and the second computing device; and
   extracting elements from the shared data set according to the instructions.

3. The method of claim 2, wherein selecting elements from the shared data set stored at the first computing device and the second computing device comprises:
   selecting elements from among the extracted elements.

4. The method of claim 1, further comprising:
   determining by the first computing device whether an acknowledgement has been received from the second computing device; and
   encrypting by the first computing device another communication using the generated result in response to determining that the acknowledgement has been received from the second computing device.

5. The method of claim 4, further comprising:
   determining that the second computing device is not authenticated in response to determining that the acknowledgement is not received.

6. The method of claim 4, further comprising:
   sending a synchronization query to a data set manager in response to determining that the acknowledgement is not received.

7. The method of claim 4, further comprising:
   determining that the second computing device is authenticated in response to determining that the acknowledgement is received.

8. A computing device, comprising:
   a memory; and
   a processor coupled to the memory and configured with processor-executable instructions to perform operations comprising:
   selecting elements from an ephemeral shared data set stored at the computing device and a second computing device;
   generating a rule set indicating locations of the selected elements in the ephemeral shared data set;
   sending the generated rule set to the second computing device;
   generating a result based on the selected elements;
   encrypting a message using the generated result; and
   sending the encrypted message to the second computing device.

9. The computing device of claim 8, wherein the processor is configured with processor-executable instructions to perform operations such that selecting elements from the ephemeral shared data set stored at the computing device and the second computing device comprises:
   receiving instructions from a data set management device to extract elements from the ephemeral shared data set stored at the computing device and the second computing device; and
   extracting elements from the shared data set according to the instructions.

10. The computing device of claim 9, wherein the processor is configured with processor-executable instructions to perform operations such that selecting elements from the shared data set stored at the computing device and the second computing device comprises:
    selecting elements from among the extracted elements.

11. The computing device of claim 8, wherein the processor is configured with processor-executable instructions to perform operations further comprising:
    determining whether an acknowledgement is received from the second computing device; and
    encrypting another communication using the generated result in response to determining that the acknowledgement is received from the second computing device.

12. The computing device of claim 11, wherein the processor is configured with processor-executable instructions to perform operations further comprising:
    determining that the second computing device is not authenticated in response to determining that the acknowledgement is not received.

13. The computing device of claim 11, wherein the processor is configured with processor-executable instructions to perform operations further comprising:
    sending a synchronization query to a data set manager in response to determining that the acknowledgement is not received.

14. The computing device of claim 11, wherein the processor is configured with processor-executable instructions to perform operations further comprising:
    determining that the second computing device is authenticated in response to determining that the acknowledgement is received.

15. A non-transitory processor-readable storage medium having stored thereon processor-executable instructions configured to cause a processor of a first computing device to perform operations comprising:

selecting elements from an ephemeral shared data set stored at the first computing device and a second computing device;
generating a rule set indicating locations of the selected elements in the ephemeral shared data set;
sending the generated rule set to the second computing device;
generating a result based on the selected elements;
encrypting a message using the generated result; and
sending the encrypted message to the second computing device.

16. The non-transitory processor-readable storage medium of claim 15, wherein the stored processor-executable instructions are configured to cause the processor of the first computing device to perform operations such that selecting elements from the ephemeral shared data set stored at the first computing device and the second computing device comprises:
receiving instructions from a data set management device to extract elements from the ephemeral shared data set stored at the first computing device and the second computing device; and
extracting elements from the shared data set according to the instructions.

17. The non-transitory processor-readable storage medium of claim 16, wherein the stored processor-executable instructions are configured to cause the processor of the first computing device to perform operations such that selecting elements from the shared data set stored at the first computing device and the second computing device comprises:
selecting elements from among the extracted elements.

18. The non-transitory processor-readable storage medium of claim 15, wherein the stored processor-executable instructions are configured to cause the processor of the first computing device to perform operations further comprising:
determining whether an acknowledgement has been received from the second computing device; and
encrypting another communication using the generated result in response to determining that the acknowledgement has been received from the second computing device.

19. The non-transitory processor-readable storage medium of claim 18, wherein the stored processor-executable instructions are configured to cause the processor of the first computing device to perform operations further comprising:
determining that the second computing device is not authenticated in response to determining that the acknowledgement is not received.

20. The non-transitory processor-readable storage medium of claim 18, wherein the stored processor-executable instructions are configured to cause the processor of the first computing device to perform operations further comprising:
sending a synchronization query to a data set manager in response to determining that the acknowledgement is not received.

21. The non-transitory processor-readable storage medium of claim 18, wherein the stored processor-executable instructions are configured to cause the processor of the first computing device to perform operations further comprising:
determining that the second computing device is authenticated in response to determining that the acknowledgement is received.

* * * * *